US006532367B1

(12) United States Patent
Suzuki

(10) Patent No.: US 6,532,367 B1
(45) Date of Patent: Mar. 11, 2003

(54) RADIO COMMUNICATION DEVICE AND MESSAGE DISPLAY METHOD THEREOF

(75) Inventor: Katsuroh Suzuki, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/329,401

(22) Filed: Jun. 10, 1999

(30) Foreign Application Priority Data

Jun. 10, 1998 (JP) .......................................... 10-162484

(51) Int. Cl.[7] ............................ H04B 7/00; H04Q 7/20

(52) U.S. Cl. ........................ 455/458; 455/466; 455/566

(58) Field of Search ................................ 455/566, 414, 455/412, 422, 458, 38.2, 656, 567, 466; 340/7.2, 7.22, 7.43, 7.51–7.63

(56) References Cited

U.S. PATENT DOCUMENTS

| | | | | | |
|---|---|---|---|---|---|
| 4,894,649 A | * | 1/1990 | Davis | 340/7.39 |
| 4,896,306 A | * | 1/1990 | Sanbongi et al. | 368/29 |
| 5,140,561 A | * | 8/1992 | Miyashita et al. | 368/10 |
| 5,239,679 A | * | 8/1993 | Muria | 340/7.52 |
| 5,258,751 A | | 11/1993 | DeLuca et al. | |
| 5,418,528 A | | 5/1995 | Hosack et al. | 340/7.52 |
| 5,473,320 A | * | 12/1995 | DeLuca et al. | 340/7.51 |
| 5,543,781 A | | 8/1996 | Ganucheau et al. | 340/7.52 |
| 5,650,776 A | | 7/1997 | Mitchell et al. | |
| 5,973,615 A | * | 10/1999 | Shima | 340/7.52 |
| 5,995,592 A | * | 11/1999 | Shirai et al. | 379/56.3 |

FOREIGN PATENT DOCUMENTS

| | | |
|---|---|---|
| EP | WO 97/17682 | 5/1997 |
| JP | 1-284029 | 11/1989 |
| JP | 2-152334 | 6/1990 |
| JP | 2-90559 | 7/1990 |
| JP | 3-89639 | 4/1991 |
| JP | 5-91023 | 4/1993 |
| JP | 5-102915 | 4/1993 |
| JP | 6-53888 | 2/1994 |
| JP | 8-317439 | 11/1996 |
| JP | 9-215026 | 8/1997 |
| JP | 10-42329 | 2/1998 |

OTHER PUBLICATIONS

Patent Abstracts of Japan No. 09107568 dated Apr. 22, 1997.

* cited by examiner

*Primary Examiner*—Lester G. Kincaid
*Assistant Examiner*—Charles Craver
(74) *Attorney, Agent, or Firm*—Scully, Scott, Murphy & Presser

(57) ABSTRACT

A radio communication device such as a pager which can display messages which have been received during a fixed time period at high speed is presented. A radio reception section extracts a message that has been addressed to the radio communication device from a selective calling signal. The received messages and information concerning the messages are stored in a memory section. An input section lets the user input information such as a selection concerning whether the user intends to let a display section display all the messages which have been stored in the memory section or the messages which have been received during the fixed time period. A control section executes relating using directory #2 information concerning the messages received during the fixed time period, when a message received during the fixed time period is stored in the memory section. When the user requested display of the messages received during the fixed time period, the control section reads out the messages received during the fixed time period from the memory section using the directory #2 information and displays the messages on the display section at the same time, thereby display of the messages received during the fixed time is executed at high speed and the convenience, operability and visual recognition of the user are improved.

42 Claims, 14 Drawing Sheets

FIG. 2

MESSAGE MEMORY

21

| MEMORY MANAGEMENT NUMBER | RECEIVED MESSAGE DATA | | RECEPTION DATE/TIME DATA | | | | DIRECTORY #1 INFORMATION | | DIRECTORY #2 INFORMATION | |
|---|---|---|---|---|---|---|---|---|---|---|
| | ADDRESS | MESSAGE | MONTH | DAY | HOUR | MINUTE | BACK | NEXT | BACK | NEXT |
| 0 | A | GOOD MORNING ! | 2 | 2 | 8 | 30 | 3 | 1 | 3 | FF |
| 1 | B | GOOD NIGHT | 2 | 1 | 23 | 50 | 0 | 2 | | |
| 2 | C | WHERE ARE YOU NOW ? | 2 | 1 | 22 | 00 | 1 | 4 | | |
| 3 | D | MEETING SUSPENDED | 2 | 2 | 10 | 00 | 6 | 0 | 6 | 0 |
| 4 | A | WELCOME BACK | 2 | 1 | 19 | 00 | 2 | 5 | | |
| 5 | B | GOOD JOB ! | 2 | 1 | 17 | 00 | 4 | FF | | |
| 6 | C | IT'S 12:30 | 2 | 2 | 12 | 30 | FF | 3 | FF | 3 |
| 7 | | UNREGISTERED | | | | | FF | 8 | | |
| 8 | | UNREGISTERED | | | | | 7 | 9 | | |
| 9 | | UNREGISTERED | | | | | 8 | FF | | |

ALL MESSAGES REGISTERED MEMORY AREA POINTER

22

| | NEW | OLD |
|---|---|---|
| ALL MESSAGES REGISTERED MEMORY AREA POINTER | 6 | 5 |

UNREGISTERED MEMORY AREA POINTER

23

| | NEW | OLD |
|---|---|---|
| UNREGISTERED MEMORY AREA POINTER | 7 | 9 |

TODAY'S MESSAGES REGISTERED MEMORY AREA POINTER

24

| | NEW | OLD |
|---|---|---|
| TODAY'S MESSAGES REGISTERED MEMORY AREA POINTER | 6 | 0 |

TODAY'S MESSAGE DISPLAY SETTING REGISTER

25

| | |
|---|---|
| TODAY'S MESSAGE DISPLAY ENABLE/DISABLE | ENABLE |
| BOUNDARY HOUR | 0 |
| BOUNDARY MINUTE | 0 |

FIG. 3A

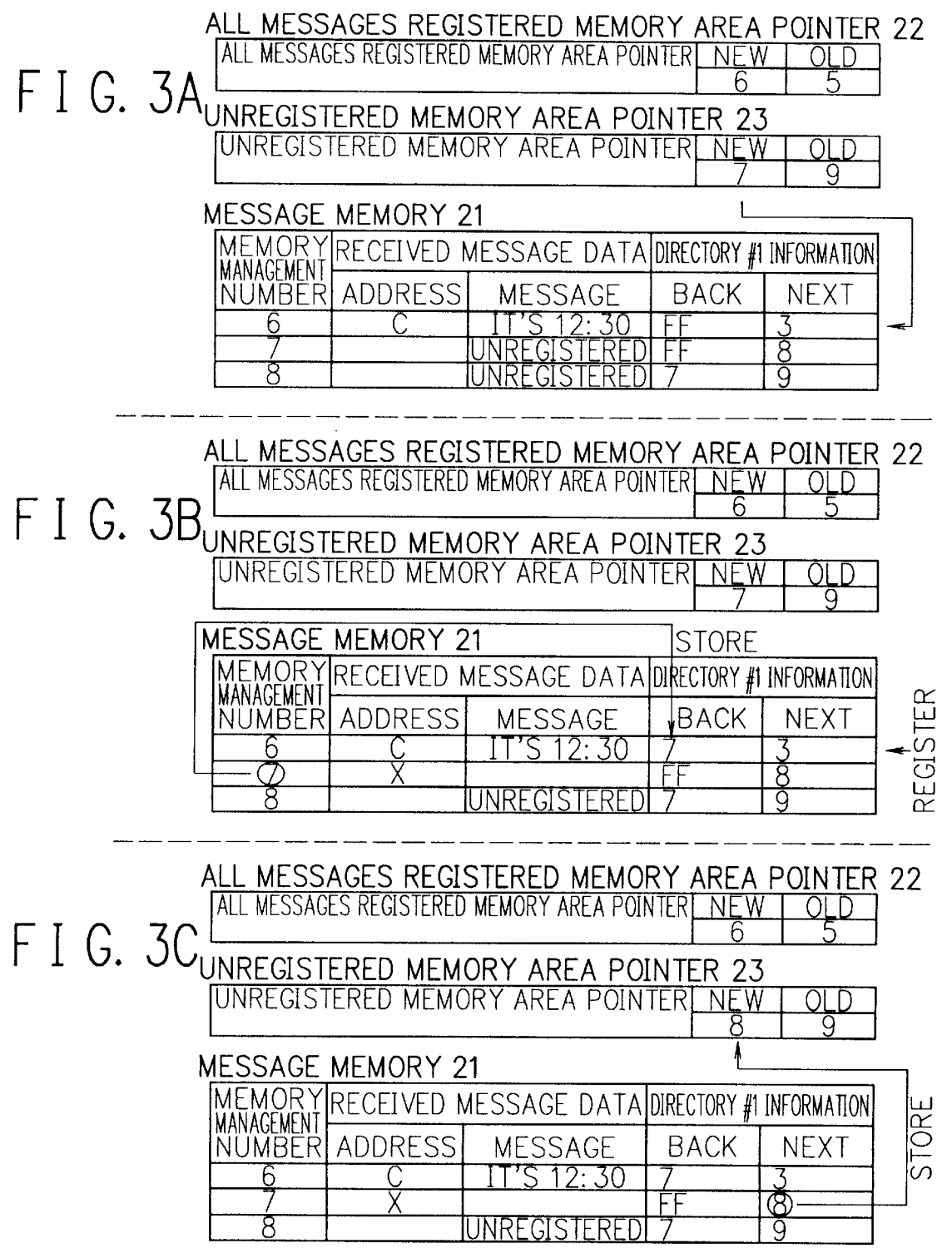

ALL MESSAGES REGISTERED MEMORY AREA POINTER 22

| ALL MESSAGES REGISTERED MEMORY AREA POINTER | NEW | OLD |
|---|---|---|
| | 6 | 5 |

UNREGISTERED MEMORY AREA POINTER 23

| UNREGISTERED MEMORY AREA POINTER | NEW | OLD |
|---|---|---|
| | 7 | 9 |

MESSAGE MEMORY 21

| MEMORY MANAGEMENT NUMBER | RECEIVED MESSAGE DATA | | DIRECTORY #1 INFORMATION | |
|---|---|---|---|---|
| | ADDRESS | MESSAGE | BACK | NEXT |
| 6 | C | IT'S 12:30 | FF | 3 |
| 7 | | UNREGISTERED | FF | 8 |
| 8 | | UNREGISTERED | 7 | 9 |

FIG. 3B

ALL MESSAGES REGISTERED MEMORY AREA POINTER 22

| ALL MESSAGES REGISTERED MEMORY AREA POINTER | NEW | OLD |
|---|---|---|
| | 6 | 5 |

UNREGISTERED MEMORY AREA POINTER 23

| UNREGISTERED MEMORY AREA POINTER | NEW | OLD |
|---|---|---|
| | 7 | 9 |

MESSAGE MEMORY 21

STORE

| MEMORY MANAGEMENT NUMBER | RECEIVED MESSAGE DATA | | DIRECTORY #1 INFORMATION | |
|---|---|---|---|---|
| | ADDRESS | MESSAGE | BACK | NEXT |
| 6 | C | IT'S 12:30 | 7 | 3 |
| 7 | X | | FF | 8 |
| 8 | | UNREGISTERED | 7 | 9 |

REGISTER

FIG. 3C

ALL MESSAGES REGISTERED MEMORY AREA POINTER 22

| ALL MESSAGES REGISTERED MEMORY AREA POINTER | NEW | OLD |
|---|---|---|
| | 6 | 5 |

UNREGISTERED MEMORY AREA POINTER 23

| UNREGISTERED MEMORY AREA POINTER | NEW | OLD |
|---|---|---|
| | 8 | 9 |

MESSAGE MEMORY 21

| MEMORY MANAGEMENT NUMBER | RECEIVED MESSAGE DATA | | DIRECTORY #1 INFORMATION | |
|---|---|---|---|---|
| | ADDRESS | MESSAGE | BACK | NEXT |
| 6 | C | IT'S 12:30 | 7 | 3 |
| 7 | X | | FF | 8 |
| 8 | | UNREGISTERED | 7 | 9 |

STORE

FIG. 5

MESSAGE MEMORY

21

| MEMORY MANAGEMENT NUMBER | RECEIVED MESSAGE DATA | | RECEPTION DATE/TIME DATA | | | | DIRECTORY #1 INFORMATION | | DIRECTORY #2 INFORMATION | |
|---|---|---|---|---|---|---|---|---|---|---|
| | ADDRESS | MESSAGE | MONTH | DAY | HOUR | MINUTE | BACK | NEXT | BACK | NEXT |
| 0 | A | GOOD MORNING ! | 2 | 2 | 8 | 30 | 3 | 1 | 3 | FF |
| 1 | B | GOOD NIGHT | 2 | 1 | 23 | 50 | 0 | 2 | | |
| 2 | C | WHERE ARE YOU NOW ? | 2 | 1 | 22 | 00 | 1 | 4 | | |
| 3 | D | MEETING SUSPENDED | 2 | 2 | 10 | 00 | 6 | 0 | 6 | 0 |
| 4 | A | WELCOME BACK | 2 | 1 | 19 | 00 | 2 | 5 | | |
| 5 | B | GOOD JOB ! | 2 | 1 | 17 | 00 | 4 | FF | | |
| 6 | C | IT'S 12:30 | 2 | 2 | 12 | 30 | 7 | 3 | FF | 3 |
| 7 | X | | | | | | FF | 6 | | |
| 8 | | UNREGISTERED | | | | | FF | 9 | | FF |
| 9 | | UNREGISTERED | | | | | 8 | FF | | |

ALL MESSAGES REGISTERED MEMORY AREA POINTER

22

| ALL MESSAGES REGISTERED MEMORY AREA POINTER | NEW | OLD |
|---|---|---|
| | 7 | 5 |

UNREGISTERED MEMORY AREA POINTER

23

| UNREGISTERED MEMORY AREA POINTER | NEW | OLD |
|---|---|---|
| | 8 | 9 |

FIG. 6

MESSAGE MEMORY

21

| MEMORY MANAGEMENT NUMBER | RECEIVED MESSAGE DATA | | RECEPTION DATE/TIME DATA | | | | DIRECTORY #1 INFORMATION | | DIRECTORY #2 INFORMATION | |
|---|---|---|---|---|---|---|---|---|---|---|
| | ADDRESS | MESSAGE | MONTH | DAY | HOUR | MINUTE | BACK | NEXT | BACK | NEXT |
| 0 | A | GOOD MORNING ! | 2 | 2 | 8 | 30 | 3 | 1 | 3 | FF |
| 1 | B | GOOD NIGHT | 2 | 1 | 23 | 50 | 0 | 2 | | |
| 2 | C | WHERE ARE YOU NOW ? | 2 | 1 | 22 | 00 | 1 | 4 | | |
| 3 | D | MEETING SUSPENDED | 2 | 2 | 10 | 00 | 6 | 0 | 6 | 0 |
| 4 | A | WELCOME BACK | 2 | 1 | 19 | 00 | 2 | 5 | | |
| 5 | B | GOOD JOB ! | 2 | 1 | 17 | 00 | 4 | FF | | |
| 6 | C | IT'S 12:30 | 2 | 2 | 12 | 30 | 7 | 3 | 7 | 3 |
| 7 | X | | | | | | FF | 6 | FF | 6 |
| 8 | | UNREGISTERED | | | | | FF | 9 | | |
| 9 | | UNREGISTERED | | | | | 8 | FF | | |

ALL MESSAGES REGISTERED MEMORY AREA POINTER

22

| ALL MESSAGES REGISTERED MEMORY AREA POINTER | NEW | OLD |
|---|---|---|
| | 7 | 5 |

UNREGISTERED MEMORY AREA POINTER

23

| UNREGISTERED MEMORY AREA POINTER | NEW | OLD |
|---|---|---|
| | 8 | 9 |

TODAY'S MESSAGES REGISTERED MEMORY AREA POINTER

24

| TODAY'S MESSAGES REGISTERED MEMORY AREA POINTER | NEW | OLD |
|---|---|---|
| | 7 | 0 |

FIG. 7

MESSAGE MEMORY (21)

| MEMORY MANAGEMENT NUMBER | RECEIVED MESSAGE DATA | | RECEPTION DATE/TIME DATA | | | | DIRECTORY #1 INFORMATION | | DIRECTORY #2 INFORMATION | |
|---|---|---|---|---|---|---|---|---|---|---|
| | ADDRESS | MESSAGE | MONTH | DAY | HOUR | MINUTE | BACK | NEXT | BACK | NEXT |
| 0 | A | GOOD MORNING ! | 2 | 2 | 8 | 30 | 3 | 1 | 3 | FF |
| 1 | B | GOOD NIGHT | 2 | 1 | 23 | 50 | 0 | 2 | | |
| 2 | C | WHERE ARE YOU NOW ? | 2 | 1 | 22 | 00 | 1 | 4 | | |
| 3 | D | MEETING SUSPENDED | 2 | 2 | 10 | 00 | 6 | 0 | 6 | 0 |
| 4 | A | WELCOME BACK | 2 | 1 | 19 | 00 | 2 | 5 | | |
| 5 | B | GOOD JOB ! | 2 | 1 | 17 | 00 | 4 | FF | | |
| 6 | C | IT'S 12:30 | 2 | 2 | 12 | 30 | FF | 3 | FF | 3 |

ALL MESSAGES REGISTERED MEMORY AREA POINTER (22)

| ALL MESSAGES REGISTERED MEMORY AREA POINTER | NEW | OLD |
|---|---|---|
| | 6 | 5 |

UNREGISTERED MEMORY AREA POINTER (23)

| UNREGISTERED MEMORY AREA POINTER | NEW | OLD |
|---|---|---|
| | FF | FF |

FIG. 8A

MESSAGE MEMORY 21

| MEMORY MANAGEMENT NUMBER | DIRECTORY #1 INFORMATION | |
|---|---|---|
| | BACK | NEXT |
| 0 | 3 | 1 |
| 1 | 0 | 2 |
| 2 | 1 | 4 |
| 3 | 6 | 0 |
| 4 | 2 | 5 |
| 5 | 4 | FF |
| 6 | FF | 3 |

← MEMORY AREA TO BE RELEASED (row 5)

UNREGISTERED MEMORY AREA POINTER 23

| UNREGISTERED MEMORY AREA POINTER | NEW | OLD |
|---|---|---|
| | FF | FF |

FIG. 8B

MESSAGE MEMORY 21

| MEMORY MANAGEMENT NUMBER | DIRECTORY #1 INFORMATION | |
|---|---|---|
| | BACK | NEXT |
| 0 | 3 | 1 |
| 1 | 0 | 2 |
| 2 | 1 | 4 |
| 3 | 6 | 0 |
| 4 | 2 | FF |
| 5 | 4 | FF |
| 6 | FF | 3 |

STORE (row 5 NEXT → row 4 NEXT)

UNREGISTERED MEMORY AREA POINTER 23

| UNREGISTERED MEMORY AREA POINTER | NEW | OLD |
|---|---|---|
| | FF | FF |

FIG. 8C

MESSAGE MEMORY 21

| MEMORY MANAGEMENT NUMBER | DIRECTORY #1 INFORMATION | |
|---|---|---|
| | BACK | NEXT |
| 0 | 3 | 1 |
| 1 | 0 | 2 |
| 2 | 1 | 4 |
| 3 | 6 | 0 |
| 4 | 2 | FF |
| 5 | FF | FF |
| 6 | FF | 3 |

← STORE (row 5)

UNREGISTERED MEMORY AREA POINTER 23

STORE (NEW) STORE (OLD)

| UNREGISTERED MEMORY AREA POINTER | NEW | OLD |
|---|---|---|
| | 5 | 5 |

FIG. 14

MESSAGE MEMORY 21A

| RECEIVED MESSAGE DATA | | RECEPTION DATE/TIME DATA | | | |
|---|---|---|---|---|---|
| ADDRESS | MESSAGE | MONTH | DAY | HOUR | MINUTE |
| B | GOOD JOB ! | 2 | 1 | 17 | 00 |
| A | WELCOME BACK | 2 | 1 | 19 | 00 |
| C | WHERE ARE YOU NOW ? | 2 | 1 | 22 | 00 |
| B | GOOD NIGHT | 2 | 1 | 23 | 50 |
| A | GOOD MORNING ! | 2 | 2 | 8 | 30 |
| D | MEETING SUSPENDED | 2 | 2 | 10 | 00 |
| C | IT'S 12:30 | 2 | 2 | 12 | 30 |

MESSAGE MEMORY 21B

| RECEIVED MESSAGE DATA | | RECEPTION DATE/TIME DATA | | | |
|---|---|---|---|---|---|
| ADDRESS | MESSAGE | MONTH | DAY | HOUR | MINUTE |
| B | GOOD JOB ! | 2 | 1 | 17 | 00 |
| D | MEETING SUSPENDED | 2 | 2 | 10 | 00 |
| C | IT'S 12:30 | 2 | 2 | 12 | 30 |

RADIO COMMUNICATION DEVICE AND MESSAGE DISPLAY METHOD THEREOF

BACKGROUND OF THE INVENTION

The present invention relates to a radio communication device and a message display method for a radio communication device, and in particular, to a radio communication device and a message display method for a radio communication device by which received and stored information such as messages can be displayed to the user at high speed.

1. Description of the Prior Art

These days, radio communication systems or radio communication services employing radio selective calling receivers (called pagers, pocket bells, etc.) as handy radio communication devices are prevailing. Such radio selective calling receivers are being more and more required further improved operability or convenience of operation.

In "a radio selective calling receiver and a control method thereof" disclosed in Japanese Patent Application Laid-Open No.HEI9-215026, a radio selective calling receiver which can receive calls to two or more selective calling numbers is designed to be able to successively display received messages which have been sent to one of its selective calling numbers. For example, received messages which have been sent to a particular selective calling number that is used by the user for business (or for private use) are selected from the received messages and displayed on a display section successively, thereby the operability and the convenience of the user are improved. The radio selective calling receiver disclosed in the document stores each message, a reception address for indicating to which selective calling number the message has been sent, and reception time information indicating the time when the message was received, thereby the message display with respect to a particular selective calling number can be executed.

A "selective calling receiver" disclosed in Japanese Patent Application Laid-Open No.HEI2-152334 is provided with a second ROM (an IC card) which is detachable/attachable to the body of the selective calling receiver for storing a plurality of predetermined messages. The selective calling receiver receives a signal including 12-bit data indicating a selective calling number and 4-bit data indicating a message number, therefore, 16 types of messages can generally be displayed by the selective calling receiver depending on the message number (4 bits). When the selective calling number in the received signal matched that of the selective calling receiver, the selective calling receiver makes a beep for informing the user of the reception of a call, and generally displays one of 16 predetermined messages (stored in a first ROM) corresponding to the message number. Meanwhile, the second ROM stores 96 (16×6) predetermined messages (one message number corresponds to 6 predetermined messages corresponding to 6 time zones), and when the second ROM is connected to the body, the selective calling receiver executes message display depending on the reception time (a time zone in which the message was received) and the message number, thereby the number of displayable messages can be increased in comparison with the number of possible message numbers included in the signal.

A "selective calling receiver provided with display functions" disclosed in Japanese Patent Application Laid-Open No.HEI3-89639, which receives, stores and displays messages, can let the user know whether a message displayed on its display section is a message received today or not, by displaying the number of days which have elapsed since the reception of the message, along with the message. A "paging receiver provided with display functions" disclosed in Japanese Utility Model Application Laid-Open No.HEI2-90559 can also let the user know whether a message displayed on the display section is a today's message or not, by displaying the message with reception time information if the message is a today's message, and displaying the message with reception date information if the message is not a today's message.

A "selective calling receiver" disclosed in Japanese Patent Application Laid-Open No.HEI5-102915 does not inform the user of reception of a call if the present time (the time when the call is received) is within a predetermined call rejection time period, and informs the user of the call reception after the call rejection time period ended.

In a "radio selective calling receiver" disclosed in Japanese Patent Application Laid-Open No.HEI10-42329, two or more time periods (a first time period 09:00~16:59 and a second time period 17:00~08:59, for example) can be set, and when the user requested display of received messages, display depending on the present time (the time when the user requested the message display) is executed. For example, in the case where the user requested display of received messages on 10:00 which is included in the first time period, the radio selective calling receiver successively reads out each received message (which has been stored in its memory section in order of reception) from the memory section, judges whether the reception time of the message belongs to the first time period (for example), displays the message on its display section if the reception time of the message belongs to the first time period, and thereby messages which have been received during the first time period are successively displayed first in order of reception. Thereafter, messages which have been received during the second time period are successively displayed on the display section in order of reception in similar way. On the other hand, in the case where the user requested display of received messages on 19:00 which is included in the second time period, messages which have been received during the second time period are successively displayed first in order of reception, and thereafter messages which have been received during the first time period are successively displayed in order of reception.

The above radio selective calling receiver can select messages which have been received during one of the predetermined time periods and successively display the selected messages, depending on when the user requested message display. Therefore, the user can see selected messages which have been received during a predetermined time period that corresponds to the time when the user made the message display request.

However, in the radio selective calling receiver, judgment on whether each message has been received during a predetermined time period or not has to be executed on every reading of a message, and thus reading out and displaying of the messages which have been received during a fixed time period can not been executed very quickly.

SUMMARY OF THE INVENTION

It is therefore the primary object of the present invention to provide a radio communication device which is provided with functions for receiving messages via radio and displaying the messages, by which messages which have been received during a fixed time period can be displayed to the user at high speed.

Another object of the present invention is to provide a message display method for a radio communication device which is provided with functions for receiving messages via radio and displaying the messages, by which messages which have been received during a fixed time period can be displayed to the user at high speed.

In accordance with a 1st aspect of the present invention, there is provided a radio reception means, a memory means, a time period message memory means, a display means, an input means and a control means. The radio reception means receives a selective calling signal via an antenna and extracts a message that has been addressed to the radio communication device from the selective calling signal. The memory means stores the messages received and extracted by the radio reception means and information concerning the messages. The time period message memory means is provided to the memory means for storing information concerning messages which have been received during a fixed time period. The display means displays information such as the messages which have been stored in the memory means. The input means lets the user input information such as a selection concerning whether the user intends to let the display means display all the messages which have been stored in the memory means or the messages which have been received during the fixed time period. The control means executes control on the components of the radio communication device such as display of the messages on the display means. The control means reads out the messages which have been received during the fixed time period from the memory means using the information stored in the time period message memory means and displays the messages on the display means if the user intended to let the display means display the messages which have been received during the fixed time period In accordance with a 2nd aspect of the present invention, in the 1st aspect, the control means executes the display of the messages on the display means according to a first display operation for displaying the messages from the oldest message or a second display operation for displaying the messages from the newest message.

In accordance with a 3rd aspect of the present invention, in the 1st aspect, the control means includes a function operation setting means, a time control means, a display control means and a message memory management means. The function operation setting means sets functions of the radio communication device such as enable/disable of the function for displaying the messages which have been received during the fixed time period, according to the information inputted via the input means. The time control means updates and outputs the time of day to be used for indicating the reception time of each message. The display control means executes control of the display of messages on the display means. The message memory management means executes management of storage and reading of the received messages in the memory means. The message memory management means stores information concerning a received message in the time period message memory means if the reception time of the received message belongs to the fixed time period.

In accordance with a 4th aspect of the present invention, in the 3rd aspect, the memory means includes a message memory means, an all messages registered memory area pointer means, a time period messages registered memory area pointer means and a time period message display function setting register means. The message memory means includes a plurality of message memory areas corresponding to memory management numbers. Each of the message memory areas can store one of the received messages, a reception address of the message, reception date/time data of the message, a first directory information to be used for indicating the order of reception of all the received messages, and a second directory information to be used for indicating the order of reception of the messages which have been received during the fixed time period. The all messages registered memory area pointer means stores a memory management number (NEW) of one of the message memory areas that stores the newest message in all the received messages stored in the message memory means and/or a memory management number (OLD) of one of the message memory areas that stores the oldest message in all the received messages stored in the message memory means. The time period messages registered memory area pointer means stores a memory management number (NEW) of one of the message memory areas that stores the newest message in the messages which have been received during the fixed time period and stored in the message memory means and/or a memory management number (OLD) of one of the message memory areas that stores the oldest message in the messages which have been received during the fixed time period and stored in the message memory means. The time period message display function setting register means stores the enable/disable of the function for displaying the messages which have been received during the fixed time period, and one or more boundary times for defining the fixed time period.

In accordance with a 5th aspect of the present invention, in the 4th aspect, the message memory management means executes reading of messages to be displayed on the display means from the message memory means, by referring first to the memory management number (NEW/OLD) stored in the time period messages registered memory area pointer means or the all messages registered memory area pointer means depending on the enable/disable of the function stored in the time period message display function setting register means, reading out the first message to be displayed from a message memory area of the message memory means designated by the memory management number (NEW/OLD), and thereafter successively reading out messages from the message memory means by referring to the second directory information or the first directory information depending on the enable/disable of the function.

In accordance with a 6th aspect of the present invention, in the 4th aspect, the first directory information stored in a message memory area storing a particular message includes the first NEXT information and the first BACK information. The first NEXT information indicates the memory management number of one of the message memory areas that stores a message that was received just before the particular message, and the first BACK information indicates the memory management number of one of the message memory areas that stores a message that was received just after the particular message. The second directory information stored in a message memory area storing a particular message includes the second NEXT information and the second BACK information. The second NEXT information indicates the memory management number of one of the message memory areas that stores one of the messages which have been received during the fixed time period that was received before the particular message, and the second BACK information indicates the memory management number of one of the message memory areas that stores one of the messages which have been received during the fixed time period that was received after the particular message.

In accordance with a 7th aspect of the present invention, in the 6th aspect, the message memory management means executes reading of messages to be displayed on the display means from the message memory means, by referring first to the memory management number (NEW/OLD) stored in the time period messages registered memory area pointer means or the all messages registered memory area pointer means depending on the enable/disable of the function stored in the time period message display function setting register means, reading out the first message to be displayed from a message memory area of the message memory means designated by the memory management number (NEW/OLD), and thereafter successively reading out messages from the message memory means by referring to the NEXT information or the BACK information of the second directory information or the first directory information depending on the enable/disable of the function.

In accordance with an 8th aspect of the present invention, in the 4th aspect, the message memory management means judges whether an unregistered message memory area exists in the message memory means or not when the message memory management means stores a received message in the message memory means, and releases a message memory area of the message memory means and changes the message memory area into an unregistered message memory area if no unregistered message memory area existed in the message memory means.

In accordance with a 9th aspect of the present invention, in the 4th aspect, the control means further includes a time match judgment means. The time match judgment means judges whether or not the time of day updated and outputted by the time control means matches a specific boundary time stored in the time period message display function setting register means, and lets the message memory management means clear the second directory information and start new relating using new second directory information if the time of day matched the specific boundary time.

In accordance with a 10th aspect of the present invention, in the 4th aspect, the time period message display function setting register means stores a boundary time so as to define the fixed time period as a time period from the boundary time to 24 hours after the time period.

In accordance with an 11th aspect of the present invention, in the 4th aspect, the time period message display function setting register means stores two boundary times so as to define the fixed time period as a time period between the two boundary times.

In accordance with a 12th aspect of the present invention, in the 5th aspect, the messages read out from the message memory means by the message memory management means are displayed on the display means at the same time.

In accordance with a 13th aspect of the present invention, in the 5th aspect, the message read out from the message memory means by the message memory management means is displayed on the display means with the reception date/time data of the message.

In accordance with a 14th aspect of the present invention, in the 5th aspect, the message read out from the message memory means by the message memory management means is displayed on the display means with the reception address and the reception date/time data of the message.

In accordance with a 15th aspect of the present invention, in the 3rd aspect, a general message memory means of the memory means stores the messages received and extracted by the radio reception means in order of reception, and the time period message memory means stores the messages received during the fixed time period in order of reception, as the information concerning the messages which have been received during the fixed time period.

In accordance with a 16th aspect of the present invention, in the 15th aspect, the message memory management means executes reading of messages to be displayed on the display means, by successively reading out the messages which have been received during the fixed time period and stored in the time period message memory means or the received messages stored in the general message memory means depending on the enable/disable of the function for displaying the messages which have been received during the fixed time period which has been set by the function operation setting means.

In accordance with a 17th aspect of the present invention, in the 15th aspect, the control means further includes a time match judgment means. The time match judgment means judges whether or not the time of day updated and outputted by the time control means matches a specific boundary time, and lets the message memory management means initialize the time period message memory means if the time of day matched the specific boundary time.

In accordance with an 18th aspect of the present invention, in the 15th aspect, the fixed time period is a time period from a boundary time to 24 hours after the time period.

In accordance with a 19th aspect of the present invention, in the 15th aspect, the fixed time period is a time period between two boundary times.

In accordance with a 20th aspect of the present invention, in the 16th aspect, the messages read out from the time period message memory means or the general message memory means by the message memory management means are displayed on the display means at the same time.

In accordance with a 21st aspect of the present invention, in the 1st aspect, two or more time period message memory means are provided so that the user can set two or more types of fixed time periods and make a selection from display modes corresponding to each of the time periods.

In accordance with a 22nd aspect of the present invention, in the 1st aspect, the radio communication device further comprises an informing means for informing the user of the reception of the message by making a beep, blinking, etc.

In accordance with a 23rd aspect of the present invention, in the 1st aspect, the radio communication device is a radio selective calling receiver such as a pager.

In accordance with a 24th aspect of the present invention, there is provided a message display method for a radio communication device which is provided with functions for receiving messages via radio and displaying the received messages. The message display method comprises a radio reception step, a memory step, a time period message memory step, a display step, an input step, a control step and a time range message display step. In the radio reception step, a radio reception means receives a selective calling signal via an antenna and extracts a message that has been addressed to the radio communication device from the selective calling signal. In the memory step, a memory means stores the message received and extracted in the radio reception step and information concerning the message. In the time period message memory step, a time period message memory means which is provided to the memory means stores information concerning the message received and extracted in the radio reception step, if the message has been received during a fixed time period. In the display step, a display means displays information such as the messages which have been stored in the memory means. In the input step, an input means lets the user input information such as a selection concerning whether the user intends to let the display means display all the messages which have been stored in the memory means or the messages which have been received during the fixed time period. In the control step, a control means executes control on the components of the radio communication device such as display of the messages on the display means. The time range message display step is included in the control step. In the time range message display step, the control means reads out the messages which have been received during the fixed time period from the memory means using the information stored in the time period message memory means and displays the messages on the display means if the user intended in the input step to let the display means display the messages which have been received during the fixed time period In accordance with a 25th aspect of the present invention, in the 24th aspect, the control means executes the display of the messages on the display means according to a first display operation for displaying the messages from the oldest message or a second display operation for displaying the messages from the newest message.

In accordance with a 26th aspect of the present invention, in the 24th aspect, the control step executed by the control means includes a function operation setting step, a time control step, a display control step and a message memory management step. In the function operation setting step, a function operation setting means of the control means sets functions of the radio communication device such as enable/disable of the function for displaying the messages which have been received during the fixed time period, according to the information inputted in the input step via the input means. In the time control step, a time control means of the control means updates and outputs the time of day to be used for indicating the reception time of each message. In the display control step, a display control means of the control means executes control of the display of messages on the display means. In the message memory management step, a message memory management means of the control means executes management of storage and reading of the received messages in the memory means. The message memory management means stores information concerning a received message in the time period message memory means if the reception time of the received message belongs to the fixed time period.

In accordance with a 27th aspect of the present invention, in the 26th aspect, the memory means for executing the memory step includes a message memory means, an all messages registered memory area pointer means, a time period messages registered memory area pointer means and a time period message display function setting register means. The message memory means includes a plurality of message memory areas corresponding to memory management numbers. Each of the memory areas can store one of the received messages, a reception address of the message, reception date/time data of the message, a first directory information to be used for indicating the order of reception of all the received messages, and a second directory information to be used for indicating the order of reception of the messages which have been received during the fixed time period. The all messages registered memory area pointer means stores a memory management number (NEW) of one of the message memory areas that stores the newest message in all the received messages stored in the message memory means and/or a memory management number (OLD) of one of the message memory areas that stores the oldest message in all the received messages stored in the message memory means. The time period messages registered memory area pointer means stores a memory management number (NEW) of one of the message memory areas that stores the newest message in the messages which have been received during the fixed time period and stored in the message memory means and/or a memory management number (OLD) of one of the message memory areas that stores the oldest message in the messages which have been received during the fixed time period and stored in the message memory means. The time period message display function setting register means stores the enable/disable of the function for displaying the messages which have been received during the fixed time period, and one or more boundary times for defining the fixed time period.

In accordance with a 28th aspect of the present invention, in the 27th aspect, reading of messages to be displayed on the display means from the message memory means in the message memory management step is executed by the message memory management means, by referring first to the memory management number (NEW/OLD) stored in the time period messages registered memory area pointer means or the all messages registered memory area pointer means depending on the enable/disable of the function stored in the time period message display function setting register means, reading out the first message to be displayed from a message memory area of the message memory means designated by the memory management number (NEW/OLD), and thereafter successively reading out messages from the message memory means by referring to the second directory information or the first directory information depending on the enable/disable of the function.

In accordance with a 29th aspect of the present invention, in the 27th aspect, the first directory information stored in a message memory area storing a particular message includes the first NEXT information and the first BACK information. The first NEXT information indicates the memory management number of one of the message memory areas that stores a message that was received just before the particular message, and the first BACK information indicates the memory management number of one of the message memory areas that stores a message that was received just after the particular message. The second directory information stored in a message memory area storing a particular message includes the second NEXT information and the second BACK information. The second NEXT information indicates the memory management number of one of the message memory areas that stores one of the messages which have been received during the fixed time period that was received before the particular message, and the second BACK information indicates the memory management number of one of the message memory areas that stores one of the messages which have been received during the fixed time period that was received after the particular message.

In accordance with a 30th aspect of the present invention, in the 29th aspect, reading of messages to be displayed on the display means from the message memory means in the message memory management step is executed by the message memory management means, by referring first to the memory management number (NEW/OLD) stored in the time period messages registered memory area pointer means or the all messages registered memory area pointer means depending on the enable/disable of the function stored in the time period message display function setting register means, reading out the first message to be displayed from a message memory area of the message memory means designated by the memory management number (NEW/OLD), and thereafter successively reading out messages from the message memory means by referring to the NEXT information or the BACK information of the second directory information or the first directory information depending on the enable/disable of the function.

In accordance with a 31st aspect of the present invention, in the 27th aspect, the message memory management means judges whether an unregistered message memory area exists in the message memory means or not when the message memory management means stores a received message in the message memory means, and releases a message memory area of the message memory means and changes the message memory area into an unregistered message memory area if no unregistered message memory area existed in the message memory means.

In accordance with a 32nd aspect of the present invention, in the 27th aspect, the control step executed by the control means further includes a time match judgment step. In the time match judgment step, a time match judgment means of the control means judges whether or not the time of day updated and outputted by the time control means in the time control step matches a specific boundary time stored in the time period message display function setting register means, and lets the message memory management means clear the second directory information and start new relating using new second directory information if the time of day matched the specific boundary time.

In accordance with a 33rd aspect of the present invention, in the 27th aspect, a boundary for defining the fixed time period as a time period from the boundary time to 24 hours after the time period is stored in the time period message display function setting register means.

In accordance with a 34th aspect of the present invention, in the 27th aspect, two boundary times for defining the fixed time period as a time period between the two boundary times are stored in the time period message display function setting register means.

In accordance with a 35th aspect of the present invention, in the 28th aspect, the messages read out from the message memory means by the message memory management means are displayed on the display means at the same time.

In accordance with a 36th aspect of the present invention, in the 28th aspect, the message read out from the message memory means by the message memory management means is displayed on the display means with the reception date/time data of the message.

In accordance with a 37th aspect of the present invention, in the 28th aspect, the message read out from the message memory means by the message memory management means is displayed on the display means with the reception address and the reception date/time data of the message.

In accordance with a 38th aspect of the present invention, in the 26th aspect, the messages received and extracted by the radio reception means in the radio reception step are stored in a general message memory means of the memory means in order of reception, and the messages received during the fixed time period are stored in the time period message memory means in order of reception, as the information concerning the messages which have been received during the fixed time period.

In accordance with a 39th aspect of the present invention, in the 38th aspect, reading of messages to be displayed on the display means is executed in the message memory management step by the message memory management means, by successively reading out the messages which have been received during the fixed time period and stored in the time period message memory means or the received messages stored in the general message memory means depending on the enable/disable of the function for displaying the messages which have been received during the fixed time period which has been set in the function operation setting step.

In accordance with a 40th aspect of the present invention, in the 38th aspect, the control step executed by the control means further includes a time match judgment step. In the time match judgment step, a time match judgment means of the control means judges whether or not the time of day updated and outputted by the time control means in the time control step matches a specific boundary time, and lets the message memory management means initialize the time period message memory means if the time of day matched the specific boundary time.

In accordance with a 41st aspect of the present invention, in the 38th aspect, the fixed time period is a time period from a boundary time to 24 hours after the time period.

In accordance with a 42nd aspect of the present invention, in the 38th aspect, the fixed time period is a time period between two boundary times.

In accordance with a 43rd aspect of the present invention, in the 39th aspect, the messages read out from the time period message memory means or the general message memory means by the message memory management means are displayed on the display means at the same time.

In accordance with a 44th aspect of the present invention, in the 24th aspect, two or more time period message memory means are provided for the time period message memory step so that the user can set two or more types of fixed time periods and make a selection from display modes corresponding to each of the time periods.

In accordance with a 45th aspect of the present invention, in the 24th aspect, the message display method further comprises an informing step in which an informing means informs the user of the reception of the message by making a beep, blinking, etc.

In accordance with a 46th aspect of the present invention, in the 24th aspect, the radio communication device is a radio selective calling receiver such as a pager.

BRIEF DESCRIPTION OF THE DRAWINGS

The objects and features of the present invention will become more apparent from the consideration of the following detailed description taken in conjunction with the accompanying drawings, in which:

FIG. 2 is a schematic diagram showing an example of information which is stored in a memory section of the radio selective calling receiver of FIG. 1;

FIG. 3A through FIG. 4C are schematic diagrams for explaining the operation of a message memory management section of the radio selective calling receiver of FIG. 1 for message registration;

FIG. 5 is a schematic diagram showing the statuses of a message memory, an all messages registered memory area pointer and an unregistered memory area pointer of the radio selective calling receiver of FIG. 1 as the result of the operations shown in FIG. 3A through FIG. 4C;

FIG. 6 is a schematic diagram showing the result of the message registration;

FIGS. 7 through 8C are schematic diagrams for explaining the operation of the message memory management section for memory area release (message deletion);

FIGS. 13A and 13B are schematic diagrams showing examples of display on a display section of the radio selective calling receiver of FIG. 1, in which FIG. 13A shows a case where all the received messages are displayed and FIG. 13B shows a case where today's messages are displayed; and FIG. 14 is a schematic diagram showing an example of information which is stored in a memory section of another radio communication device according to the present invention.

DESCRIPTION OF THE PREFERRED EMBODIMENTS

Figure 1:
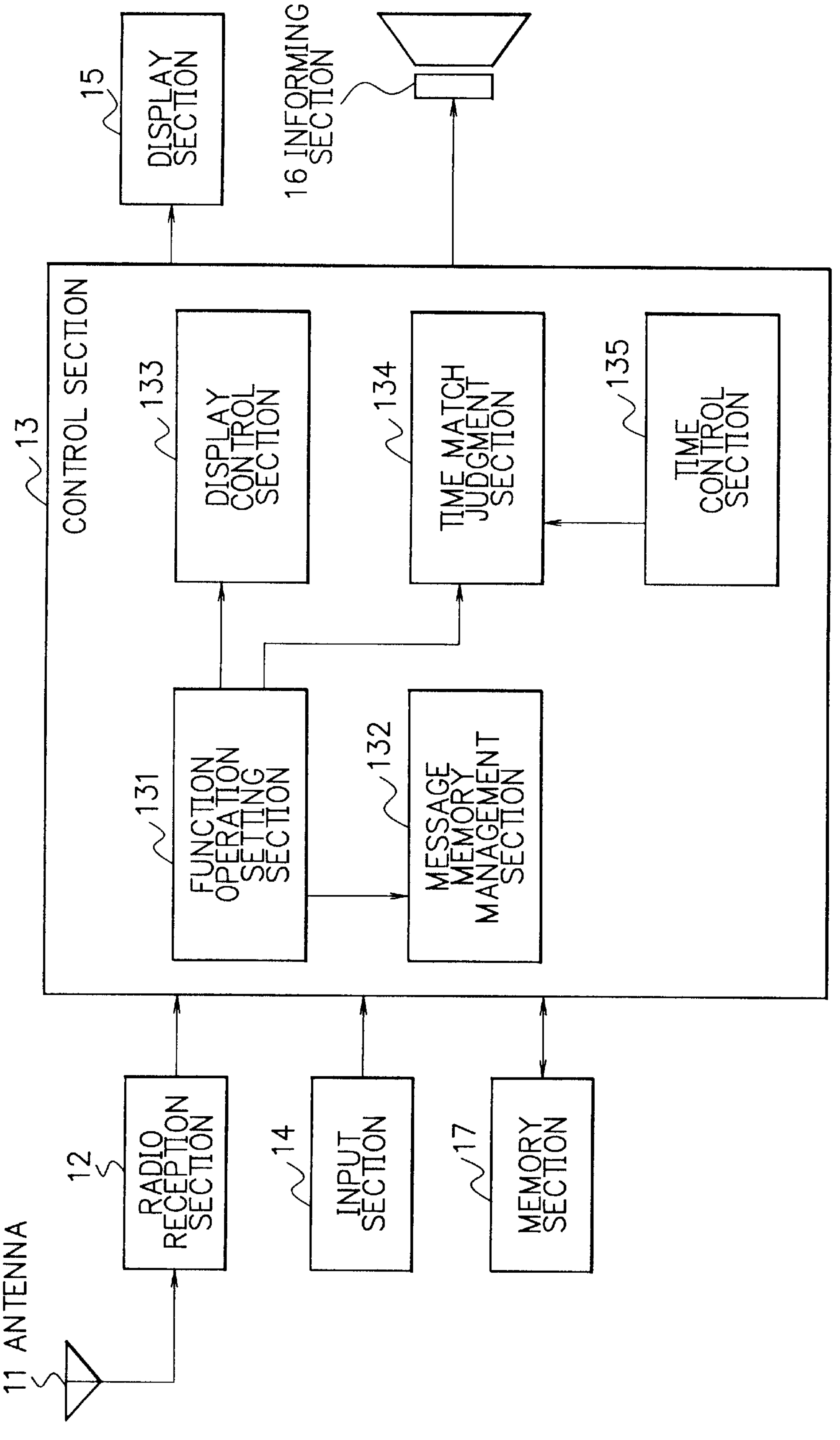
FIG. 1 is a block diagram showing the composition of a radio selective calling receiver as a radio communication device according to an embodiment of the present invention.

Referring now to the drawings, a description will be given in detail of preferred embodiments in accordance with the present invention.

FIG. 1 is a block diagram showing the composition of a radio selective calling receiver as a radio communication device according to an embodiment of the present invention. Referring to FIG. 1, the radio selective calling receiver of this embodiment comprises an antenna 11 for receiving selective calling signals which are transmitted by radio base stations, a radio reception section 12 for receiving the selective calling signal via the antenna 11, extracting a selective calling number from the selective calling signal, and extracting message information from the selective calling signal if the extracted selective calling number matches one of selective calling numbers of the radio selective calling receiver, a control section 13 for controlling components of the radio selective calling receiver, an input section 14 for letting the user of the radio selective calling receiver input information such as enable/disable of functions, a display section 15 for displaying information such as received messages, menus, etc., an informing section 16 for informing the user of reception of a message by making a beep etc., and a memory section 17 for storing information such as received messages.

The control section 13 is realized by, for example, a microprocessor unit which is composed of a CPU (Central Processing Unit), ROM (Read Only Memory), RAM (Random Access Memory), etc. The input section 14 includes number keys etc. for letting the user input data. The display section 15 is realized by, for example, an LCD (Liquid Crystal Display). The informing section 16 is realized by a speaker, an LED (Light Emitting Diode) etc. The memory section 17 is realized by RAM etc.

The control section 13 shown in FIG. 1 includes a function operation setting section 131, a message memory management section 132, a display control section 133, a time match judgment section 134, and a time control section 135. Data outputted by the function operation setting section 131 is supplied to the message memory management section 132, the display control section 133 and the time match judgment section 134. Data outputted by the time control section 135 is supplied to the time match judgment section 134.

The above components of the control section 13 operate as follows. The function operation setting section 131 receives the result of a selection input by the user (whether the user intends to enable or disable a function operation of the radio selective calling receiver such as a today's message display function which will be described later) from the input section 14, and informs the message memory management section 132, the display control section 133 and the time match judgment section 134 about the selection input (enable/disable). The function operation setting section 131 also receives a boundary time which is inputted by the user to the input section 14, and sends the boundary time information to the time match judgment section 134.

The message memory management section 132 is supplied with a received message from the radio reception section 12, and stores the message and information concerning the message in a message memory area of the memory section 17. Further, if a selection input of the user concerning enable/disable of a function for displaying messages which have been received during a fixed time period was "enable", the message memory management section 132 judges whether or not the reception time (i.e. the time when the message was received) is within the fixed time period (today etc.), and relates the received message to other messages which have been received during the time period, as will be described later.

The display control section 133 receives a message display request by the user from the input section 14, and displays messages on the display section 15 according to the message display request. For example, if the message display request by the user was a request to display messages which have been received during the fixed time period (today, for example), the display control section 133 displays messages which have been received during the time period on the display section 15, according to the relationship which has been given by the message memory management section 132 to the messages which have been received during the fixed time period. If the message display request by the user was a request to display all the received messages, the display control section 133 displays all the messages on the display section 15, in order of reception (from the oldest message) or from the newest message.

Incidentally, while "today" is employed in this embodiment as the fixed time period (span), various types of time periods can be employed as the fixed time period. For example, the fixed time period can be "9 a.m. to 5 p.m.", "predetermined 10 minutes in each hour", "9 a.m. to 10 a.m. and 4 p.m. to 5 p.m.", etc.

The aforementioned "boundary time" is used for defining the "today". The "today" starts at the boundary time and ends 24 hours after the boundary time. In other words, a new "today" starts at the boundary time.

The time control section 135 executes update of the time of day (i.e. the present time). The time match judgment section 134 judges whether the time of day updated by the time control section 135 matches (i.e. is equal to) the boundary time or not. If the time matched, the relationship between today's messages (i.e. the relationship which have been given to the messages which have been received today (during the fixed time period)) is initialized (cleared), and a new relating between new today's messages is started by the message memory management section 132.

In the following, the operation of the radio selective calling receiver of FIG. 1 will be described in detail.

FIG. 2 is a schematic diagram showing an example of information which is stored in the memory section 17. Referring to FIG. 2, the memory section 17 includes a message memory 21, an all messages registered memory area pointer 22, an unregistered memory area pointer 23, a today's messages registered memory area pointer 24, and a today's message display setting register 25.

The message memory 21 stores received message data, reception date/time data, directory #1 information and directory #2 information, with respect to each memory management number. Each of the memory management numbers corresponds to a memory address in the message memory 21, and is used for indicating or designating a memory address in the message memory 21.

The received message data includes a reception address and a received message. The reception date/time data includes, for example, the month/day/hour/minute of the time when the message was received.

The directory #1 information relates all the received messages and unregistered (unused) memory areas by "BACK" and "NEXT" of the memory management numbers. Concretely, in the "BACK" of the directory #1 information of a particular message, the memory management number of a message which was received just after the particular message is stored. On the other hand, the memory management number of a message which was received just before the particular message is stored in the "NEXT" of the directory #1 information of the particular message. Therefore, the "NEXT" and "BACK" means the order of message display in the case where the messages are displayed from the newest message. The newest message does not have its "BACK", and the oldest message in the message memory 21 does not have its "NEXT". Therefore, data "FF" indicating the end of message data is stored in the "BACK" of the newest message and the "NEXT" of the oldest message. The directory #1 information also relates unregistered memory areas similarly using the "BACK" and "NEXT".

The directory #2 information relates today's messages (i.e. messages received today) by "BACK" and "NEXT" of the memory management numbers, similarly to the directory #1 information. Concretely, the memory management number of a today's message which was received after a particular today's message is stored in the "BACK" of the directory #2 information of the particular today's message, and the memory management number of a today's message which was received before the particular today's message is stored in the "NEXT" of the directory #2 information of the particular today's message. The newest today's message does not have its "BACK", and the oldest today's message in the message memory 21 does not have its "NEXT". Therefore, data "FF" indicating the end of today's message data is stored in the "BACK" of the newest today's message and the "NEXT" of the oldest today's message.

The all messages registered memory area pointer 22, the unregistered memory area pointer 23 and the today's messages registered memory area pointer 24 store the memory management number (NEW) of the newest message and the memory management number (OLD) of the oldest message, with respect to each relationship. Concretely, the all messages registered memory area pointer 22 stores the memory management numbers (NEW and OLD) of the memory areas for the newest message and the oldest message in the message memory 21. If "FF"s are stored in the "NEW" and "OLD" of the all messages registered memory area pointer 22, it means that there is no message in the message memory 21. The unregistered memory area pointer 23 stores the memory management numbers (NEW and OLD) of the newest unregistered (unused) memory area and the oldest unregistered (unused) memory area according to the directory #1 information. If "FF"s are stored in the "NEW" and "OLD" of the unregistered message memory 21. The today's messages registered memory area pointer 24 stores the memory management numbers (NEW and OLD) of the memory areas for the newest today's message and the oldest today's message in the message memory 21. If "FF"s are stored in the "NEW" and "OLD" of the today's messages registered memory area pointer 24, it means that there is no today's message in the message memory 21.

For example, referring to the all messages registered memory area pointer 22 shown in FIG. 2, a memory management number "6" is stored in the "NEW", since a memory area having the memory management number "6" stores the newest message. On the other hand, a memory management number "5" is stored in the "OLD", since a memory area having the memory management number "5" stores the oldest message. Referring to the unregistered memory area pointer 23 shown in FIG. 2, a memory management number "7" is stored in the "NEW", since a memory area having the memory management number "7" is the newest unregistered memory area according to the directory #1 information. On the other hand, a memory management number "9" is stored in the "OLD", since a memory area having the memory management number "9" is the oldest unregistered memory area according to the directory #1 information. Referring to the today's messages registered memory area pointer 24 shown in FIG. 2, a memory management number "6" is stored in the "NEW", since a memory area having the memory management number "6" stores the newest today's message. On the other hand, a memory management number "0" is stored in the "OLD", since a memory area having the memory management number "0" stores the oldest today's message.

Therefore, when all the received messages stored in the message memory 21 are read out starting from the newest message, the "NEW" of the all messages registered memory area pointer 22 is first referred to, in order to read out the newest message in the message memory 21 first. In order to read the next message, the "NEXT" of the directory #1 information of the newest message (i.e. the current message) is referred to next, and thereby a message stored in a memory area corresponding to the memory management number "NEXT" is read out. On the other hand, when all the messages stored in the message memory 21 are read out in order of reception (starting from the oldest message), the "OLD" of the all messages registered memory area pointer 22 is first referred to, in order to read out the oldest message in the message memory 21 first. In order to read the next message, the "BACK" of the directory #1 information of the oldest message (i.e. the current message) is referred to next, and thereby a message stored in a memory area corresponding to the memory management number "BACK" is read out.

When today's messages stored in the message memory 21 is read out starting from the newest today's message, the "NEW" of the today's messages registered memory area pointer 24 is first referred to, in order to read out the newest today's message in the message memory 21 first. In order to read the next today's message, the "NEXT" of the directory #2 information of the newest today's message (i.e. the current message) is referred to next, and thereby a today's message stored in a memory area corresponding to the memory management number "NEXT" is read out. On the other hand, when today's messages stored in the message memory 21 is read out in order of reception (starting from the oldest today's message), the "OLD" of the today's messages registered memory area pointer 24 is first referred to, in order to read out the oldest today's message in the message memory 21 first. In order to read the next today's message, the "BACK" of the directory #2 information of the oldest today's message (i.e. the current message) is referred to next, and thereby a today's message stored in a memory area corresponding to the memory management number "BACK" is read out.

The today's message display setting register 25 is used for storing setting information for executing the today's message display (i.e. display of messages which were received today). The today's message display setting register 25 stores enable/disable of the today's message display function which has been set by the selection input of the user, and the hour/minute of the boundary time which has been inputted by the user. In the example shown in FIG. 2, the today's message display has been enabled, and the boundary time inputted by the user is 0:00 a.m. (twelve 0'clock midnight). Needless to say, the boundary time can also be set differently (9:00 a.m., 5:30 p.m., etc.). According to the setting information stored in the today's message display setting register 25, the message memory management section 132, the display control section 133 and the time match judgment section 134 of the control section 13 operate.

In the following, message registration and memory area release (message deletion) in the message memory 21 which are executed by the message memory management section 132 will be described, referring to FIG. 3A through FIG. 8C. FIG. 3A through FIG. 6 are schematic diagrams for explaining the operation of the message memory management section 132 for message registration, and FIGS. 7 through 8C are schematic diagrams for explaining the operation of the message memory management section 132 for memory area release (message deletion).

First, the operation of the message memory management section 132 for message registration will be explained referring to FIG. 3A through FIG. 6. Incidentally, explanation will be given with respect to a case where the memory section 17 has an initial state shown in FIG. 2, for example.

In order to register a newly received message "IT'S NEW !" in the memory section 17, the message memory management section 132 first refers to the "NEW" of the unregistered memory area pointer 23, and judges that the message should be registered in a memory area of the message memory 21 that has the memory management number "NEW" (i.e. 7), as shown in FIG. 3A.

Subsequently, the message memory management section 132 registers the newly received "received message data" and its "reception date/time data" in the memory area having the memory management number "NEW" (7), and stores the memory management number "7" of the memory area in the directory #1 information "BACK" of a memory area whose memory management number is the "NEW" (i.e. 6) of the all messages registered memory area pointer 22, as shown in FIG. 3B.

Subsequently, in order to relate unregistered memory areas correctly, the message memory management section 132 stores a memory management number "8" which has been stored in the directory #1 information "NEXT" of the memory area having the memory management number "7" in the "NEW" of the unregistered memory area pointer 23, as shown in FIG. 3C.

Figure 4A:
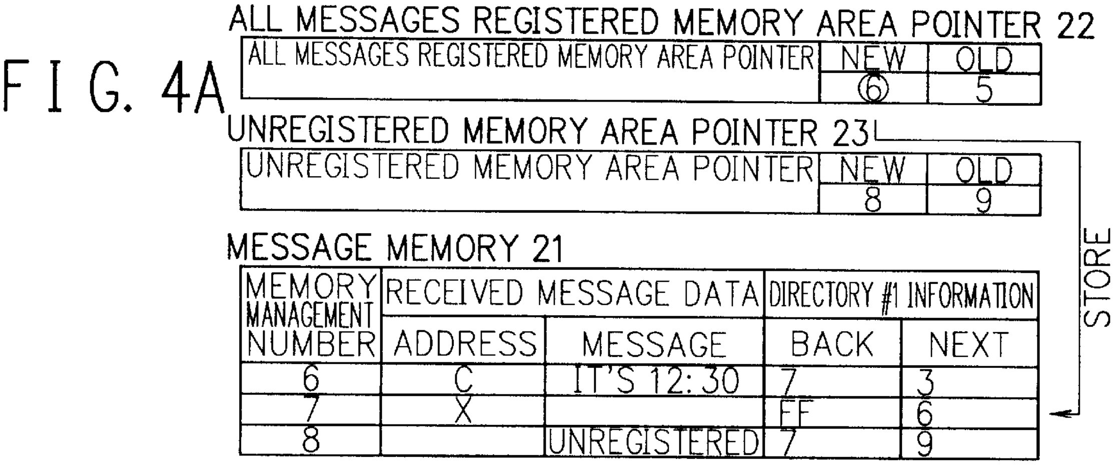

Subsequently, the message memory management section 132 stores a memory management number "6" which has been stored in the "NEW" of the all messages registered memory area pointer 22 in the directory #1 information "NEXT" of the memory area having the memory management number "7", as shown in FIG. 4A.

Figure 4B:
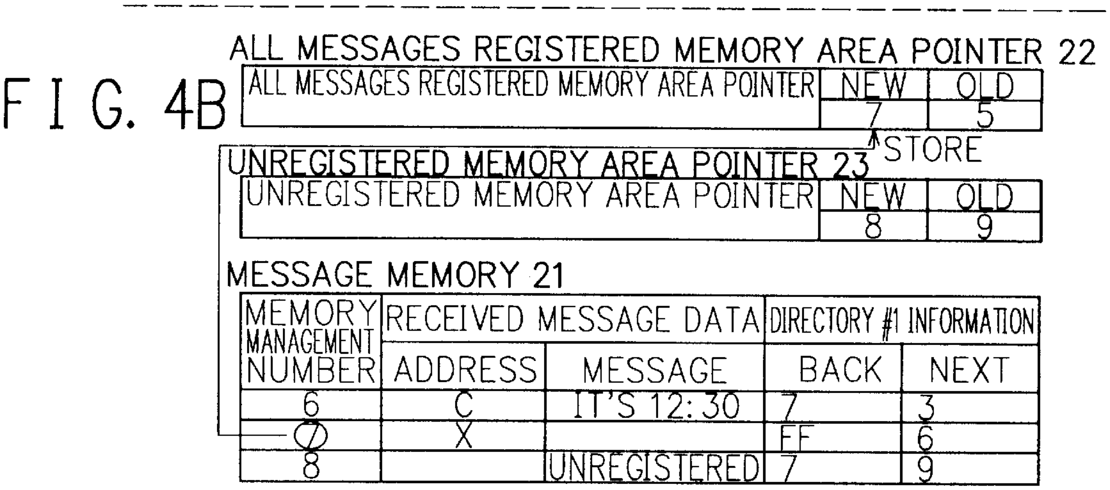

Subsequently, the message memory management section 132 stores data "FF" in the directory #1 information "BACK" of the memory area having the memory management number "7" ("FF"→"FF", not changed), and stores the memory management number "7" of the memory area in the "NEW" of the all messages registered memory area pointer 22, as shown in FIG. 4B, thereby new relationship between all the received messages has been set.

Figure 4C:
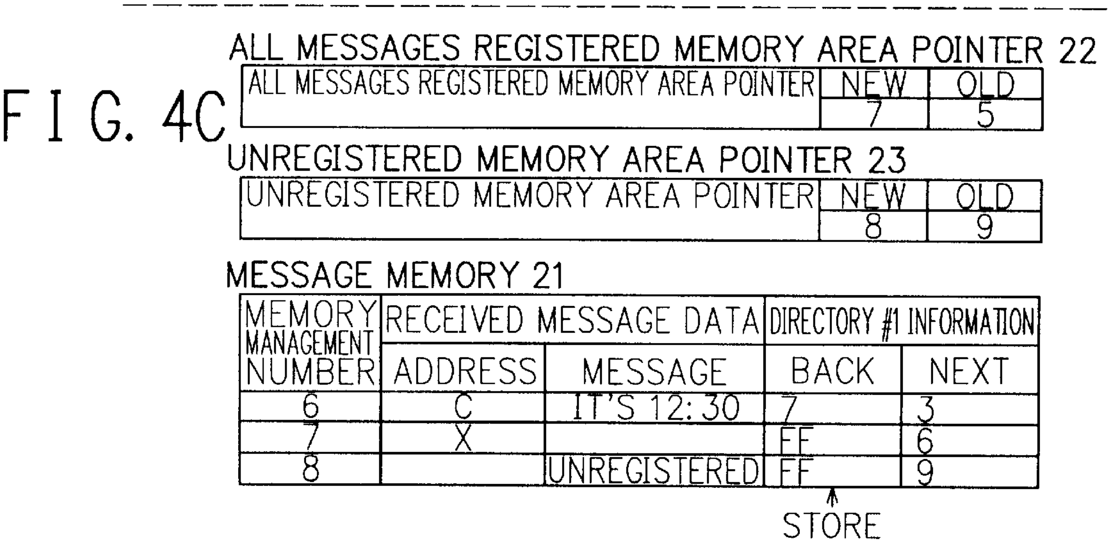

Subsequently, the message memory management section 132 stores data "FF" in the directory #1 information "BACK" of a memory area (the newest unregistered memory area) having the memory management number "8" (corresponding to the "NEW" of the unregistered memory area pointer 23), as shown in FIG. 4C.

FIG. 5 shows the statuses of the message memory 21, the all messages registered memory area pointer 22 and the unregistered memory area pointer 23 as the result of the operations which have been shown in FIG. 3A through FIG. 4C.

Thereafter, the message memory management section 132 executes relating to the today's messages using the directory #2 information, similarly to the relating to all the received messages using the directory #1 information. FIG. 6 shows the statuses of the message memory 21, the all messages registered memory area pointer 22, the unregistered memory area pointer 23 and the today's messages registered memory area pointer 24 after the relating using the directory #2 information. Referring to FIG. 6, the memory management number "7" of the memory area to which the newly received message was registered has been stored in the directory #2 information "BACK" of a memory area having the memory management number 6 (which had been the "NEW" of the today's messages registered memory area pointer 24), and a memory management number "6" (which had been stored in the "NEW" of the today's messages registered memory area pointer 24) has been stored in the directory #2 information "NEXT" of the memory area having the memory management number "7", and the memory management number "7" of the memory area has been stored in the "NEW" of the today's messages registered memory area pointer 24. By the operations described above, the message registration by the message memory management section 132 is completed.

Next, the operation of the message memory management section 132 for memory area release (message deletion) in the case where the unregistered memory area pointer 23 holds data "FF"s will be explained referring to FIG. 7 through FIG. 8C. Incidentally, explanation will be given with respect to a case where the memory section 17 has an initial state shown in FIG. 7, for example.

Referring to FIG. 7, the message memory 21 has 7 memory areas corresponding to 7 memory management numbers 0 through 6, and messages have been registered in all the memory areas. Therefore, the unregistered memory area pointer 23 holds data "FF" both in the "NEW" and the "OLD". In such a case, a memory area has to be released and changed into an unregistered memory area, in order to register a received message in the message memory 21.

Referring to FIG. 8A, when a memory area is released, a memory area storing the oldest message (i.e. the memory area having the memory management number "5") is released.

Thereafter, the message memory management section 132 stores a memory management number "FF" which has been stored in the directory #1 information "NEXT" of the released memory area (having the memory management number "5") in the directory #1 information "NEXT" of a memory area having a memory management number that has been stored in the directory #1 information "BACK" of the released memory area, as shown in FIG. 8B.

Subsequently, the message memory management section 132 stores data "FF" in the directory #1 information "BACK" and "NEXT" of the released memory area (having the memory management number "5"), and stores the memory management number "5" of the released memory area in the "NEW" and the "OLD" of the unregistered memory area pointer 23, as shown in FIG. 8C. By the operations described above, the memory area release by the message memory management section 132 is completed.

In the following, the operation of the function operation setting section 131 will be explained. The user of the radio selective calling receiver executes selection inputs for setting the functions of the radio selective calling receiver, by seeing menus displayed on the display section 15 and operating the input section 14.

The selection inputs executed by the user include setting of enable/disable of the "today's message display function", setting of the boundary time, etc. For the setting of enable/disable of the today's message display function, the input section 14 waits for a selection input by the user and receives the selection input, and the function operation setting section 131 judges whether the user selected "enable" or "disable" of the today's message display function. Thereafter, the function operation setting section 131 stores the result (enable/disable) in the today's message display setting register 25 of the memory section 17, thereby the setting of enable/disable of the today's message display function is completed. When the user selected "enable" of the today's message display function, the setting of the boundary time is also executed. The function operation setting section 131 receives a signal concerning the boundary time inputted by the user from the input section 14, and stores the boundary time in the today's message display setting register 25.

Figure 9:
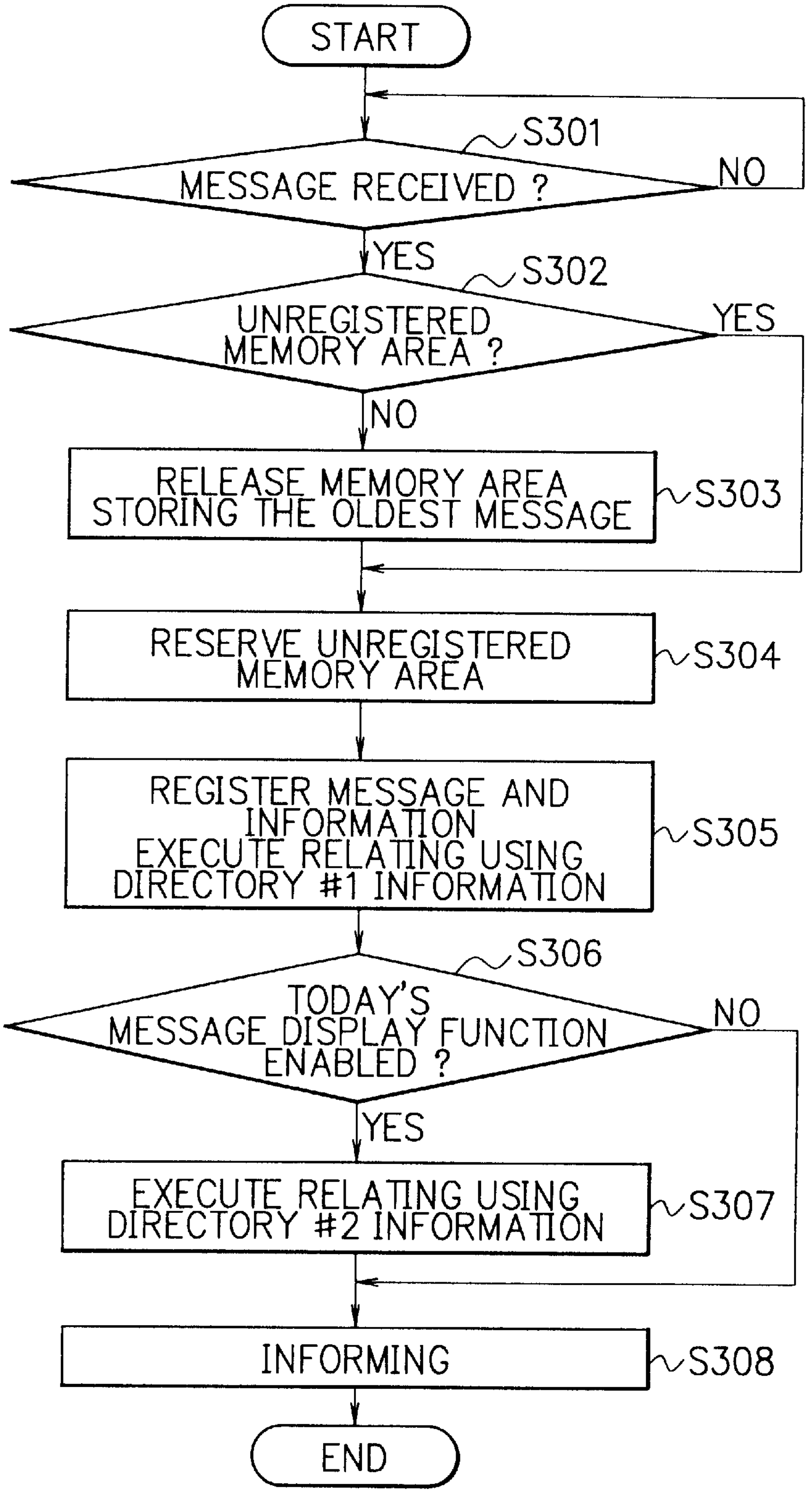
FIG. 9 is a flow chart showing a first example of the operation of a control section of the radio selective calling receiver of FIG. 1 for registering a received message in the message memory.

In the following, an example of the operation of the control section 13 when a message is received will be explained referring to FIG. 9. FIG. 9 is a flow chart showing a first example of the operation of the control section 13 for registering a received message in the message memory 21.

Referring to FIG. 9, the control section 13 monitors the radio reception section 12 and constantly judges whether a message addressed to the radio selective calling receiver has been received by the radio reception section 12 or not (step S301). If a message has been received ("YES" in the step S301), the message memory management section 132 of the control section 13 registers the received message and information concerning the received message in the memory section 17. First, the message memory management section 132 judges whether or not an unregistered (unused) memory area exists in the message memory 21 (step S302). For the judgment, the message memory management section 132 refers to the unregistered memory area pointer 23, and judges that no unregistered memory area exists in the message memory 21 if the unregistered memory area pointer 23 holds the data "FF". If no unregistered memory area exists ("NO" in the step S302), the message memory management section 132 releases a memory area that stores the oldest message (step S303) and thereby reserves an unregistered memory area (step S304). If an unregistered memory area exists ("YES" in the step S302), the message memory management section 132 reserves the unregistered memory area (step S304). Subsequently, the message memory management section 132 registers the received message and related information in the unregistered memory area, and executes the relating using the directory #1 information (step S305). Subsequently, the message memory management section 132 refers to the today's message display setting register 25, and judges whether the today's message display function has been enabled by the user or not (step S306). If the today's message display function has been enabled ("YES" in the step S306), the message memory management section 132 executes the relating using the directory #2 information (step S307). Subsequently, the informing section 16 makes a beep in order to inform the user of the message reception, according to an instruction of the control section 13 (step S308). By the operations described above, registration of a newly received message and related information, relating between all the received messages, relating between today's messages, and informing to the user are executed.

Figure 10:
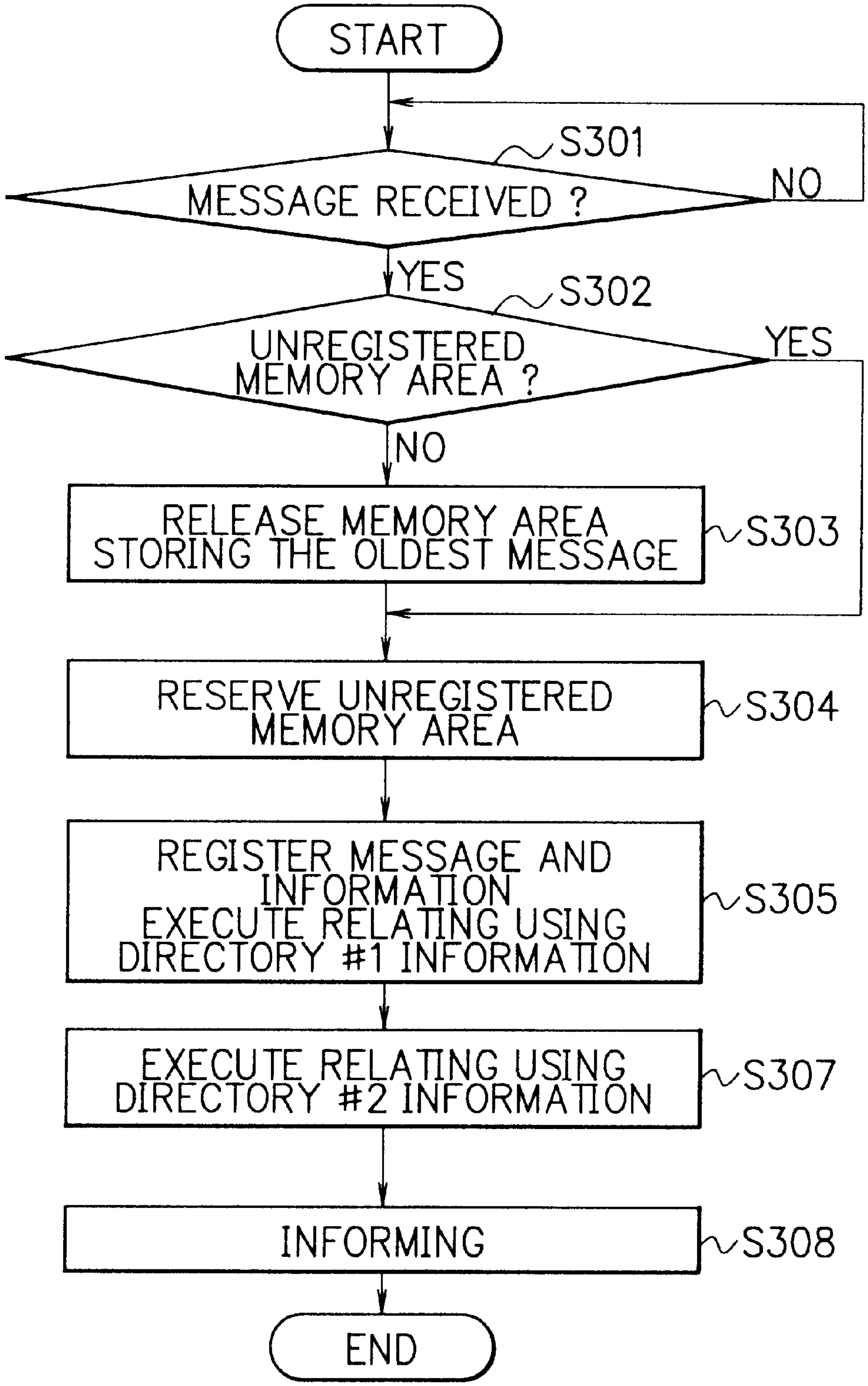
FIG. 10 is a flow chart showing a second example of the operation of the control section for registering a received message in the message memory.

In the following, a second example of the operation of the control section 13 when a message is received will be explained referring to FIG. 10. FIG. 10 is a flow chart showing a second example of the operation of the control section 13 for registering a received message in the message memory 21.

The flow chart of FIG. 10 differs from FIG. 9, in that the judgment of the step S306 of FIG. 9 is omitted in FIG. 10. In other words, the message memory management section 132 in the second example necessarily executes the relating using the directory #2 information with respect to every message received today, regardless of whether or not the today's message display function has been enabled by the user. Therefore, in the second example, even if some messages were received today and thereafter the user enabled the today's message display function, the today's messages can be displayed according to the today's message display function, since the relating using the directory #2 information has already been executed.

Figure 11:
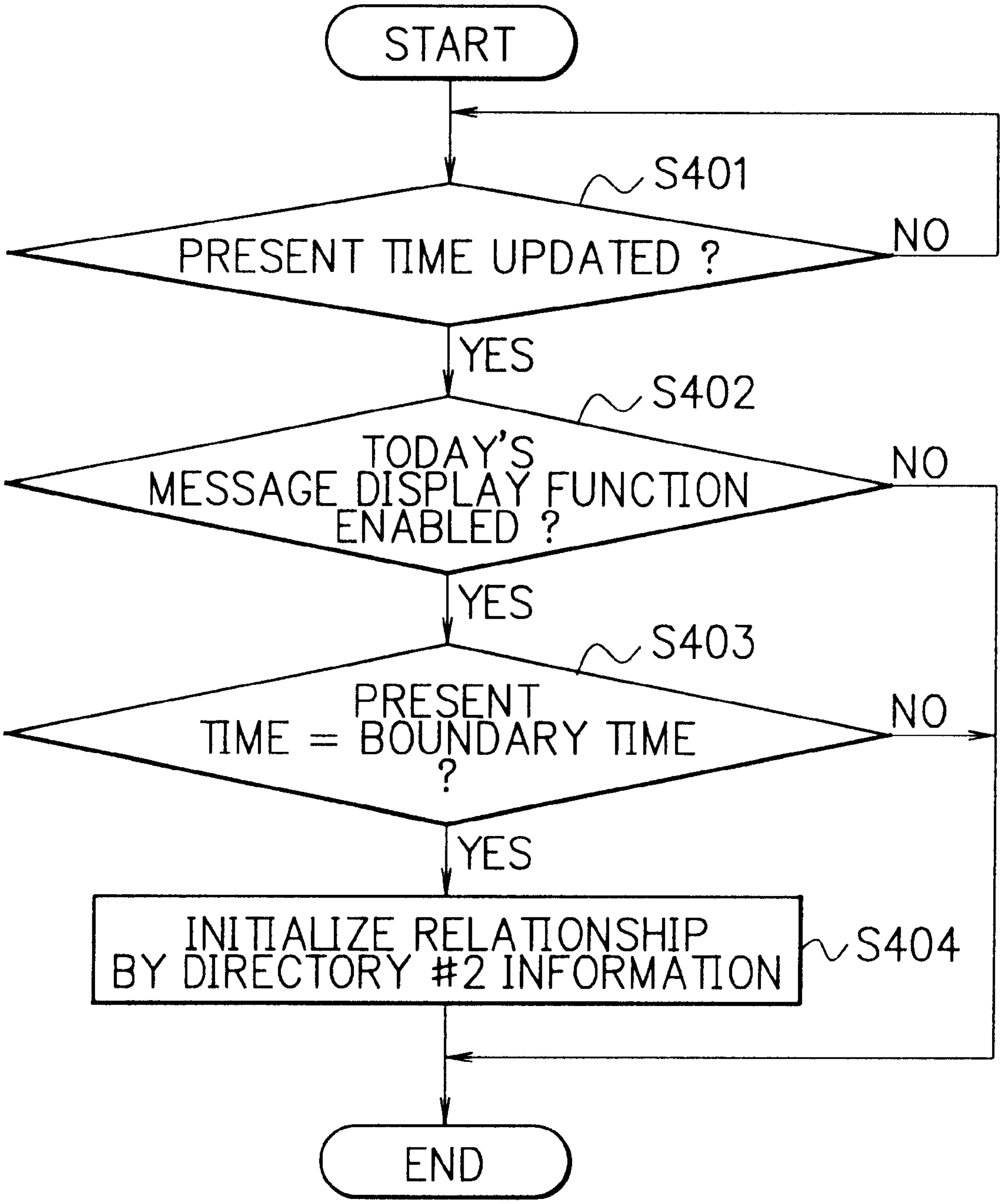
FIG. 11 is a flow chart showing the operation of the control section concerning update of the time.

In the following, the operation of the control section 13 concerning update of the time will be explained referring to FIG. 11. FIG. 11 is a flow chart showing the operation of the control section 13 concerning update of the time.

Referring to FIG. 11, the control section 13 first judges whether or not update of the time of day (present time) has been executed by the time control section 135 (step S401). If the present time has been updated ("YES" in the step S401), the message memory management section 132 of the control section 13 refers to the today's message display setting register 25, and thereby judges whether the today's message display function has been enabled or not (step S402).

If the today's message display function has been disabled ("NO" in the step S402), the process is ended. If the today's message display function has been enabled ("YES" in the step S402), the message memory management section 132 refers to the boundary time in the today's message display setting register 25, and the time match judgment section 134 judges whether or not the updated present time matches the boundary time (step S403). If matched ("YES" in the step S403), the message memory management section 132 judges that a new "today" started, and initializes (clears) the relationship between today's messages (i.e. the relationship according to the directory #2 information), and starts a new relating between today's messages using the directory #2 information (step S404). If the updated present time did not match the boundary time ("NO" in the step S403), the message memory management section 132 judges that the "today" is still continuing, and the process is ended without initializing the relationship according to the directory #2 information.

Figure 12:
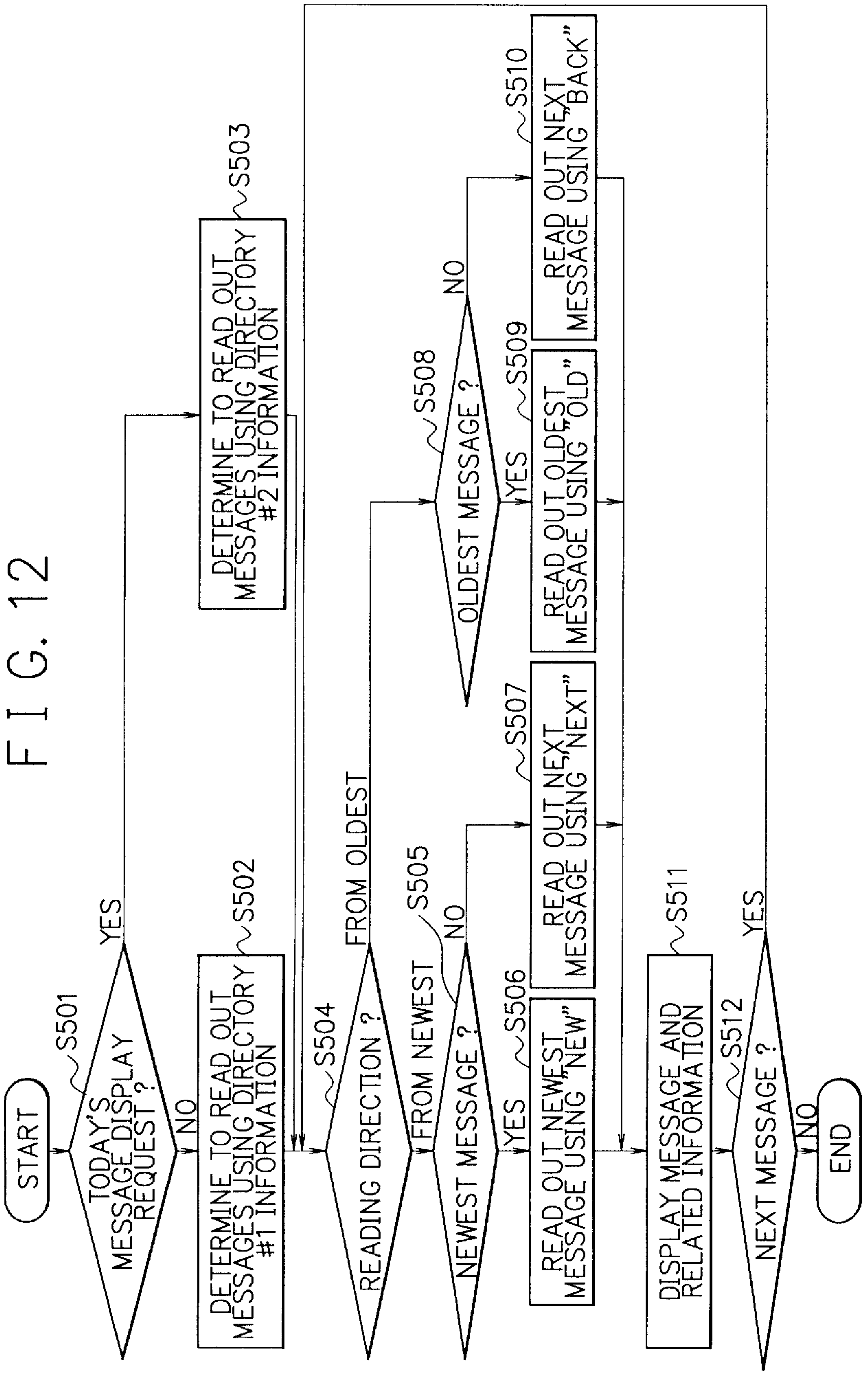
FIG. 12 is a flow chart showing the operation of the control section for reading out messages from the message memory.

In the following, the operation of the control section 13 for reading out messages from the message memory 21 will be explained referring to FIG. 12. FIG. 12 is a flow chart showing the operation of the control section 13 for reading out messages from the message memory 21.

Referring to FIG. 12, when the user of the radio selective calling receiver made a request for displaying received messages by operating the input section 14, the control section 13 judges whether the request is a request for the today's message display or a request for displaying all the received messages (step S501). If the request is a request for the today's message display ("YES" in the step S501), the message memory management section 132 of the control section 13 determines to use the directory #1 information for reading out messages from the message memory 21 (step S502). If the request is a request for displaying all the received messages ("NO" in the step S501), the message memory management section 132 determines to use the directory #2 information for reading out messages from the message memory 21 (step S503).

Subsequently, the message memory management section 132 judges whether the direction of reading out messages which has been set is "reading from the newest message" or "reading from the oldest message" (step S504). If the message reading direction is "reading from the newest message", the message memory management section 132 judges whether the message to read out is the newest message or not (step S505). If the message to read out is the newest message ("YES" in the step S505), the message memory management section 132 reads out the newest message from the message memory 21 by referring to the "NEW" of the all messages registered memory area pointer 22 (in the case where the message memory management section 132 uses the directory #1 information) or the today's messages registered memory area pointer 24 (in the case where the message memory management section 132 uses the directory #2 information) (step S506). If the message to read out is not the newest message ("NO" in the step S505), the message memory management section 132 reads out the (next) message from the message memory 21 by referring to the "NEXT" of the directory #1 information (in the case where the message memory management section 132 uses the directory #1 information) or the directory #2 information (in the case where the message memory management section 132 uses the directory #2 information) of the message which has just been read out (step S507). Subsequently, the display control section 133 of the control section 13 displays the message (and related information) read out from the message memory 21 on the display section 15 (step S511), and thereafter proceeds to step S512.

On the other hand, if the message reading direction is "reading from the oldest message" in the step S504, the message memory management section 132 judges whether the message to read out is the oldest message or not (step S508). If the message to read out is the oldest message ("YES" in the step S508), the message memory management section 132 reads out the oldest message from the message memory 21 by referring to the "OLD" of the all messages registered memory area pointer 22 (in the case where the message memory management section 132 uses the directory #1 information) or the today's messages registered memory area pointer 24 (in the case where the message memory management section 132 uses the directory #2 information) (step S509). If the message to read out is not the oldest message ("NO" in the step S508), the message memory management section 132 reads out the (next) message from the message memory 21 by referring to the "BACK" of the directory #1 information (in the case where the message memory management section 132 uses the directory #1 information) or the directory #2 information (in the case where the message memory management section 132 uses the directory #2 information) of the message which has just been read out (step S510). Subsequently, the display control section 133 displays the message (and related information) read out from the message memory 21 on the display section 15 (step S511), and thereafter proceeds to step S512.

In the step S512, the message memory management section 132 judges whether or not there is a next message to read out from the message memory 21, by referring to the "NEXT" (in the case where the message reading direction is "reading from the newest message") or "BACK" (in the case where the message reading direction is "reading from the oldest message") of the directory #1 information (in the case where the message memory management section 132 uses the directory #1 information) or the directory #2 information (in the case where the message memory management section 132 uses the directory #2 information) of the message which has just been read out and displayed. If there is a next message to read out ("YES" in the step S512), the process is returned to the step S504. If there is no next message to read out ("NO" in the step S512), the process is ended.

Figure 13A:
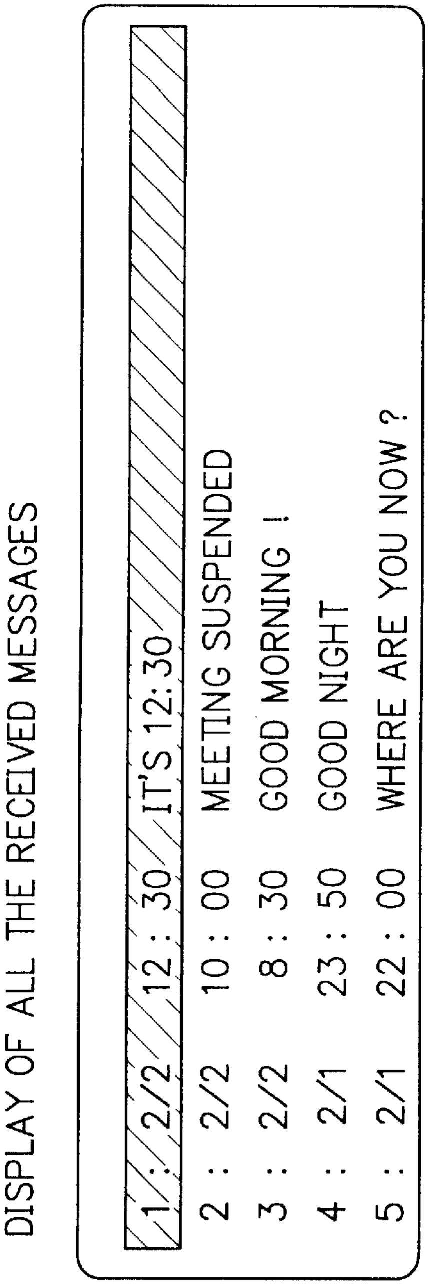
Figure 13B:
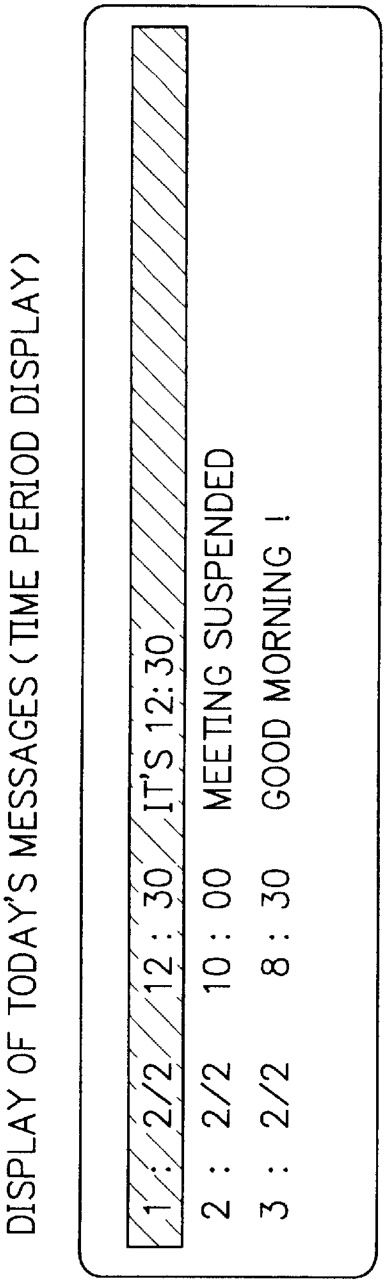

FIGS. 13A and 13B are schematic diagrams showing examples of display on the display section 15. FIG. 13A shows an example of display in which all the received messages are displayed, and FIG. 13B shows an example of display in which today's messages (i.e. messages which have been received during the fixed time period) are displayed in the case where the today's message display function has been enabled by the user.

Referring to FIG. 13A, all the received messages stored in the message memory 21 are displayed on the display section 15 regardless of whether or not the message belongs to the today's messages. In the example of FIG. 13A, five messages are displayed at the same time on the display section 15 from the newest message, and each message is displayed along with the reception date/time data, that is, the date (month/day) and the time of reception of the message. It is also possible to further display the reception address "A", "B", "C", "D", etc. of each message along with the reception date/time data.

Referring to FIG. 13B, messages which have been received today are selected from the received messages and displayed at the same time on the display section 15 from the newest message, thereby the user can recognize the today's messages (messages which have been received during the fixed time period) at a glance without error.

As described above, in the radio communication device (radio selective calling receiver) according to the embodiment of the present invention, when a message addressed to the radio communication device is received, the received message and related information (a reception address, reception date/time data, etc.) are stored in a memory area (corresponding to a memory management number) of the message memory 21 of the memory section 17. Along with storing the received message and related information, the relating between all the received messages using the directory #1 information and the relating between the today's messages (i.e. messages which have been received during a fixed time period) using the directory #2 information is executed by the message memory management section 132. The user of the radio communication device can input a selection concerning enable/disable of the today's message display function (i.e. enable/disable of the function for displaying the messages which have been received during the fixed time period) by operating the input section 14, and display of the received messages is executed according to the selection. In the case where the user enabled the today's message display function, the message memory management section 132 first refers to the "NEW" or the "OLD" of the today's messages registered memory area pointer 24 and thereby reads out the first message to display. Thereafter, today's messages (i.e. the messages which have been received during the fixed time period) are successively read out from the message memory 21 by referring to the "NEXT" or the "BACK" of the directory#2 information, thereby the messages which have been received during the fixed time period can be read out very quickly from the message memory 21 and displayed on the display section 15 at high speed. Further, by the relating between the received messages using the directory #1/#2 information, messages can be stored randomly (i.e. in random order) in the message memory 21, and thus management of memory areas of the message memory 21 can be done flexibly.

As mentioned before, while "today" has been employed in the above embodiment as the fixed time period, various types of time periods such as "9 a.m. to 5 p.m.", "predetermined 10 minutes in each hour", "9 a.m. to 10 a.m. and 4 p.m. to 5 p.m.", etc. can be employed as the fixed time period. In such cases, the control section 13 judges whether the reception time (i.e. the present time clocked by the time control section 135) is within the fixed time period or not, and the message memory management section 132 executes the relating (between the messages which have been received during the fixed time period) using the directory #2 information if the reception time is within the fixed time period.

It is also possible to design the radio communication device so that the user can set two or more types of time periods and make a selection from a plurality of display modes corresponding to each of the time periods (that is, the user can request display of messages which have been received during one of the time periods). In such cases, the message memory management section 132 executes the relating with respect to each message group (corresponding to each of the time periods), using directory #2 information, directory #3 information, directory #4 information, etc.

Incidentally, while the message memory management section 132 in the above embodiment executed the relating between the received messages using the directory #1/#2 information, it is also possible to let the message memory management section 132 store received messages in two or more message memories 21A, 21B, etc. in order of reception without executing the relating between the received messages. FIG. 14 is a schematic diagram showing an example of information which is stored in a message memory 21A and a message memory 21B of a memory section 17A of such a radio communication device according to the present invention. Referring to FIG. 14, the message memory 21A stores all the received messages in order of reception, and the message memory 21B stores messages which have been received during a fixed time period (9:00~18:00, for example) in order of reception. In this example, the message memories 21A and 21B do not store the directory #1/#2 information, and the memory section 17A does not include the memory area pointers 22, 23 and 24 which have been employed in the above embodiment. In the case where the user enabled the function for displaying messages which have been received during the fixed time period, the messages stored in the message memory 21B are successively read out by the message memory management section 132 and displayed on the display section 15. Therefore, high speed display of messages which have been received during a fixed time period can also be realized by such a radio communication device.

As set forth hereinabove, in the radio communication device and a message display method for a radio communication device according to the present invention, a time period message memory means (memory areas of the message memory 21 for storing the directory #2 information, the message memory 21B) for storing information concerning messages which have been received during the fixed time period is provided to the memory section 17, and if the user requested display of the messages which have been received during the fixed time period, the control section 13 reads out the messages which have been received during the fixed time period from the memory section 17 using the information stored in the time period message memory means and displays the messages on the display section 15. Therefore, the messages which have been received during the fixed time period can be read out from memory section 17 and displayed on the display section 15 at high speed. A plurality of selected messages can be displayed at once and/or at the same time on the display section 15 by simple operation of the input section 14, therefore the convenience, operability and visual recognition of the user can be improved. Further, the user can select the direction of reading and displaying the messages: from the newest message or in order of reception (from the oldest message), and each message is displayed along with the date and the time of reception of the message, thereby the convenience and visual recognition of the user can be improved further.

Incidentally, while the above explanation has been given taking a radio selective calling receiver (pager etc.) as an example, the radio communication device according to the present invention also includes a portable cellular phone, a PHS (Personal Handy-phone System) terminal, personal digital assistants, etc. which are provided with functions for receiving messages via radio and displaying the messages.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A radio communication device which is provided with functions for receiving messages via radio and displaying the received messages, comprising:

a radio reception means for receiving a selective calling signal via an antenna and extracting a message addressed to the radio communication device from the selective calling signal;

a memory means for storing the messages received and extracted by the radio reception means and information concerning the messages;

a time period message memory means which is provided to the memory means for storing information concerning messages received during a fixed time period;

a display means for displaying information including the messages stored in the memory means;

an input means for letting the user input information including a selection concerning whether the user intends to let the display means display one of (a) all the messages which have been stored in the memory means and (b) the messages which have been received during the fixed time period;

a control means for executing control on the components of the radio communication device including display of the messages on the display means, the control means reading out the messages received during the fixed time period from the memory means using the information stored in the time period message memory means and displays the messages on the display means if the user intended to let the display means display the messages received during the fixed time period;

the control means including:

a function operation setting means for setting functions of the radio communication device enable/disable of the function for displaying the messages received during the fixed time period, according to the information inputted via the input means;

a time control means for updating and outputting the time of day to be used for indicating the reception time of each message;

a display control means for executing control of the display of messages on the display means;

a message memory management means for executing management of storage and reading of the received messages in the memory means, the message memory management means storing information concerning a received message in the time period message memory means if the reception time of the received message belongs to the fixed time period;

the memory means including:

a message memory means including a plurality of message memory areas corresponding to memory management numbers, each of the message memory areas able to store (a) one of the received messages, (b) a reception address of the message, (c) reception date/time data of the message, (d) a first directory information to be used for indicating the order of reception of all the received messages, and (e) a second directory information to be used for indicating the order of reception of the messages received during the fixed time period;

an all messages registered memory area pointer means for storing at least one of (a) a memory management number (NEW) of one of the message memory areas that stores the newest message with all the received messages stored in the message memory means and (b) a memory management number (OLD) of one of the message memory areas that stores the oldest message in all the received messages stored in the message memory means;

a time period messages registered memory area pointer means for storing at least one of (a) a memory management number (NEW) of one of the message memory areas that stores the newest message in the messages received during the fixed time period and stored in the message memory means and (b) a memory management number (OLD) of one of the message memory areas that stores the oldest message with the messages received during the fixed time period and stored in the message memory means; and a time period message display function setting register means for storing the enable/disable of the function for displaying the messages received during the fixed time period, and at least one boundary time for defining the fixed time period.

2. A radio communication device as claimed in claim 1, wherein the control means executes the display of the messages on the display means according to one of (a) a first display operation for displaying the messages from the oldest message and (b) a second display operation for displaying the messages from the newest message.

3. A radio communication device as claimed in claim 1, wherein the message memory management means executes reading of messages to be displayed on the display means from the message memory means, by referring first to the memory management number (NEW/OLD) stored in the time period messages registered memory area pointer means or the all messages registered memory area pointer means depending on the enable/disable of the function stored in the time period message display function setting register means, reading out the first message to be displayed from a message memory area of the message memory means designated by the memory management number (NEW/OLD), and thereafter successively reading out messages from the message memory means by referring to the second directory information or the first directory information depending on the enable/disable of the function.

4. A radio communication device as claimed in claim 3, wherein the messages read out from the message memory means by the message memory management means are displayed on the display means at the same time.

5. A radio communication device as claimed in claim 3, wherein the message read out from the message memory means by the message memory management means is displayed on the display means with the reception date/time data of the message.

6. A radio communication device as claimed in claim 3, wherein the message read out from the message memory means by the message memory management means is displayed on the display means with the reception address and the reception date/time data of the message.

7. A radio communication device as claimed in claim 1, wherein:

the first directory information stored in a message memory area storing a particular message includes:

first NEXT information which indicates the memory management number of one of the message memory areas that stores a message that was received just before the particular message; and first BACK information which indicates the memory management number of one of the message memory areas that stores a message that was received just after the particular message, and the second directory information stored in a message memory area storing a particular message includes:

second NEXT information which indicates the memory management number of one of the message memory areas that stores one of the messages received during the fixed time period that was received before the particular message; and second BACK information which indicates the memory management number of one of the message memory areas that stores one of the messages received during the fixed time period that was received after the particular message.

8. A radio communication device as claimed in claim 7, wherein the message memory management means executes reading of messages to be displayed on the display means from the message memory means, by referring first to the memory management number (NEW/OLD) stored in the time period messages registered memory area pointer means or the all messages registered memory area pointer means depending on the enable/disable of the function stored in the time period message display function setting register means, reading out the first message to be displayed from a message memory area of the message memory means designated by the memory management number (NEW/OLD), and thereafter successively reading out messages from the message memory means by referring to the NEXT information or the BACK information of the second directory information or the first directory information depending on the enable/disable of the function.

9. A radio communication device as claimed in claim 1, wherein the message memory management means judges whether an unregistered message memory area exists in the message memory means or not when the message memory management means stores a received message in the message memory means, and releases a message memory area of the message memory means and changes the message memory area into an unregistered message memory area if no unregistered message memory area existed in the message memory means.

10. A radio communication device as claimed in claim 1, wherein the control means further includes a time match judgment means for judging whether or not the time of day updated and outputted by the time control means matches a specific boundary time stored in the time period message display function setting register means, and letting the message memory management means clear the second directory information and start new relating using new second directory information if the time of day matched the specific boundary time.

11. A radio communication device as claimed in claim 1, wherein the time period message display function setting register means stores a boundary time so as to define the fixed time period as a time period from the boundary time to 24 hours after the time period.

12. A radio communication device as claimed in claim 1, wherein the time period message display function setting register means stores two boundary times so as to define the fixed time period as a time period between the two boundary times.

13. A radio communication device as claimed in claim 1 wherein:

a general message memory means of the memory means stores the messages received and extracted by the radio reception means in order of reception, and the time period message memory means stores the messages received during the fixed time period in order of reception, as the information concerning the messages which have been received during the fixed time period.

14. A radio communication device as claimed in claim 13, wherein the message memory management means executes reading of messages to be displayed on the display means, by successively reading out the messages which have been received during the fixed time period and stored in the time period message memory means or the received messages stored in the general message memory means depending on the enable/disable of the function for displaying the messages which have been received during the fixed time period which has been set by the function operation setting means.

15. A radio communication device as claimed in claim 14, wherein at least one of the messages read out from the time period message memory means and at least one of the messages read out from the general message memory means by the message memory management means are displayed on the display means at the same time.

16. A radio communication device as claimed in claim 15, wherein the radio communication device is a radio selective calling receiver, said radio selective calling receiver including a pager.

17. A radio communication device as claimed in claim 13, wherein the control means further includes a time match judgment means for judging whether or not the time of day updated and outputted by the time control means matches a specific boundary time, and letting the message memory management means initialize the time period message memory means if the time of day matched the specific boundary time.

18. A radio communication device as claimed in claim 13, wherein the fixed time period is a time period from a boundary time to 24 hours after the time period.

19. A radio communication device as claimed in claim 13, wherein the fixed time period is a time period between two boundary times.

20. A radio communication device as claimed in claim 1, wherein two or more time period message memory means are provided so that the user can set two or more types of fixed time periods and make a selection from display modes corresponding to each of the time periods.

21. A radio communication device as claimed in claim 1, further comprising an informing means for informing the user of the reception of the message, the informing means including at least one of (a) making a beep, and (b) blinking.

22. A message display method for a radio communication device which is provided with functions for receiving messages via radio and displaying the received messages, comprising the steps of:

a radio reception step in which a radio reception means receives a selective calling signal via an antenna and extracts a message that has been addressed to the radio communication device from the selective calling signal;

a memory step in which a memory means stores the message received and extracted in the radio reception step and information concerning the message;

a time period message memory step in which a time period message memory means which is provided to the memory means stores information concerning the message received and extracted in the radio reception step if the message has been received during a fixed time period;

a display step in which a display means displays information including the messages stored in the memory means;

an input step in which an input means lets the user input information including a selection concerning whether the user intends to let the display means display (a) all the messages stored in the memory means and (b) the messages received during the fixed time period;

a control step in which a control means executes control on the components of the radio communication device including display of the messages on the display means;

a time range message display step included in the control step, in which the control means reads out the messages received during the fixed time period from the memory means using the information stored in the time period message memory means and displays the messages on the display means if the user intended in the input step to let the display means display the messages received during the fixed time period;

the control step executed by the control means including:

a function operation setting step in which a function operation setting means of the control means sets functions of the radio communication device enable/disable of the function for displaying the messages received during the fixed time period, according to the information inputted in the input step via the input means;

a time control step in which a time control means of the control means updates and outputs the time of day to be used for indicating the reception time of each message;

a display control step in which a display control means of the control means executes control of the display of messages on the display means;

a message memory management step in which a message memory management means of the control means executes management of storage and reading of the received messages in the memory means, in which the message memory management means stores information concerning a received message in the time period message memory means if the reception time of the received message belongs to the fixed time period;

and the memory means for executing the memory step includes:

a message memory means including a plurality of message memory areas corresponding to memory management numbers, each of the message memory areas able to store (a) one of the received messages, (b) a reception address of the message, (c) reception date/time data of he message, (d) a first directory information to be used for indicating the order of reception of all the received messages, and (e) a second directory information to be used for indicating the order of reception of the messages which have been received during the fixed time period;

an all messages registered memory area pointer means for storing at least one of (a) a memory management number (NEW) of one of the message memory areas that stores the newest message with all the received messages stored in the message memory means and (b) a memory management number (OLD) of one of the message memory areas that stores the oldest message in all the received messages stored in the message memory means;

a time period messages registered memory area pointer means for storing at least one of (a) a memory management number (NEW) of one of the message memory areas that stores the newest message in the messages received during the fixed time period and stored in the message memory means and (b) a memory management number (OLD) of one of the message memory areas that stores the oldest message in the messages received during the fixed time period and stored in the message memory means; and a time period message display function setting register means for storing the enable/disable of the function for displaying the messages received during the fixed time period, and one or more boundary times for defining the fixed time period.

23. A message display method as claimed in claim 22, wherein the control means executes the display of the messages on the display means according to a first display operation for displaying the messages from the oldest message or a second display operation for displaying messages from the newest message.

24. A message display method as claimed in claim 22, wherein reading of messages to be displayed on the display means from the message memory means in the message memory management step is executed by the message memory management means, by referring first to the memory management number (NEW/OLD) stored in the time period messages registered memory area pointer means or the all messages registered memory area pointer means depending on the enable/disable of the function stored in the time period message display function setting register means, reading out the first message to be displayed from a message memory area of the message memory means designated by the memory management number (NEW/OLD), and thereafter successively reading out messages from the message memory means by referring to the second directory information or the first directory information depending on the enable/disable of the function.

25. A message display method as claimed in claim 24, wherein the messages read out from the message memory means by the message memory management means are displayed on the display means at the same time.

26. A message display method as claimed in claim 24, wherein the message read out from the message memory means by the message memory management means is displayed on the display means with the reception date/time data of the message.

27. A message display method as claimed in claim 24, wherein the message read out from the message memory means by the message memory management means is displayed on the display means with the reception address and the reception date/time data of the message.

28. A message display method as claimed in claim 22, wherein:

the first directory information stored in a message memory area storing a particular message includes:

first NEXT information which indicates the memory management number of one of the message memory areas that stores a message that was received just before the particular message; and first BACK information which indicates the memory management number of one of the message memory areas that stores a message that was received just after the particular message, and the second directory information stored in a message memory area storing a particular message includes:

second NEXT information which indicates the memory management number of one of the message memory areas that stores one of the messages received during the fixed time period that was received before the particular message; and second BACK information which indicates the memory management number of one of the message memory areas that stores one of the messages received during the fixed time period that was received after the particular message.

29. A message display method as claimed in claim 28, wherein reading of messages to be displayed on the display means from the message memory means in the message memory management step is executed by the message memory management means, by referring first to the memory management number (NEW/OLD) stored in the time period messages registered memory area pointer means or the all messages registered memory area pointer means depending on the enable/disable of the function stored in the time period message display function setting register means, reading out the first message to be displayed from a message memory area of the message memory means designated by the memory management number (NEW/OLD), and thereafter successively reading out messages from the message memory means by referring to the NEXT information or the BACK information of the second directory information or the first directory information depending on the enable/disable of the function.

30. A message display method as claimed in claim 22, wherein the message memory management means judges whether an unregistered message memory area exists in the message memory means or not when the message memory management means stores a received message in the message memory means, and releases a message memory area of the message memory means and changes the message memory area into an unregistered message memory area if no unregistered message memory area existed in the message memory means.

31. A message display method as claimed in claim 22, wherein the control step executed by the control means further includes a time match judgment step in which a time match judgment means of the control means judges whether or not the time of day updated and outputted by the time control means in the time control step matches a specific boundary time stored in the time period message display function setting register means, and lets the message memory management means clear the second directory information and start new relating using new second directory information if the time of day matched the specific boundary time.

32. A message display method as claimed in claim 22, wherein a boundary for defining the fixed time period as a time period from the boundary time to 24 hours after the time period is stored in the time period message display function setting register means.

33. A message display method as claimed in claim 22, wherein two boundary times for defining the fixed time period as a time period between the two boundary times are stored in the time period message display function setting register means.

34. A message display method as claimed in claim 22, wherein:

the messages received and extracted by the radio reception means in the radio reception step are stored in a general message memory means of the memory means in order of reception, and the messages received during the fixed time period are stored in the time period message memory means in order of reception, as the information concerning the messages received during the fixed time period.

35. A message display method as claimed in claim 34, wherein reading of messages to be displayed on the display means is executed in the message memory management step by the message memory management means, by successively reading out one of (a) the messages received during the fixed time period and stored in the time period message memory means (b) the received messages stored in the general message memory means, depending on the enable/disable of the function for displaying the messages received during the fixed time period which has been set in the function operation setting step.

36. A message display method as claimed in claim 34, wherein at least one of the messages read out from the time period message memory means and at least one of the messages read out from the general message memory means by the message memory management means are displayed on the display means at the same time.

37. A message display method as claimed in claim 34, wherein the control step executed by the control means further includes a time match judgment step in which a time match judgment means of the control means judges whether or not the time of day updated and outputted by the time control means in the time control step matches a specific boundary time, and lets the message memory management means initialize the time period message memory means if the time of day matched the specific boundary time.

38. A message display method as claimed in claim 34, wherein the fixed time period is a time period from a boundary time to 24 hours after the time period.

39. A message display method as claimed in claim 34, wherein the fixed time period is a time period between two boundary times.

40. A message display method as claimed in claim 22, wherein two or more time period message memory means are provided for the time period message memory step so that the user can set two or more types of fixed time periods, and make a selection from display modes corresponding to each of the time periods.

41. A message display method as claimed in claim 22, further comprising an informing step in which an informing means informs the user of the reception of the message, the informing means including performing at least one step of (a) making a beep, and (b) blinking.

42. A message display method as claimed in claim 22, wherein the radio communication device is a radio selective calling receiver, said radio selective calling receiver including a pager.

* * * * *